(12) United States Patent
Ajima et al.

(10) Patent No.: US 9,164,907 B2
(45) Date of Patent: Oct. 20, 2015

(54) INFORMATION PROCESSING APPARATUS, PARALLEL COMPUTER SYSTEM, AND CONTROL METHOD FOR SELECTIVELY CACHING DATA

(71) Applicant: FUJITSU LIMITED, Kawasaki-shi, Kanagawa (JP)

(72) Inventors: Yuichiro Ajima, Kawasaki (JP); Tomohiro Inoue, Kawasaki (JP); Shinya Hiramoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 14/047,059

(22) Filed: Oct. 7, 2013

(65) Prior Publication Data
US 2014/0040558 A1    Feb. 6, 2014

Related U.S. Application Data

(63) Continuation of application No. PCT/JP2011/058832, filed on Apr. 7, 2011.

(51) Int. Cl.
*G06F 12/08* (2006.01)
*G06F 15/173* (2006.01)

(52) U.S. Cl.
CPC ........ *G06F 12/0815* (2013.01); *G06F 12/0802* (2013.01); *G06F 12/0813* (2013.01); *G06F 12/0817* (2013.01); *G06F 12/0888* (2013.01); *G06F 15/173* (2013.01); *G06F 12/084* (2013.01)

(58) Field of Classification Search
None
See application file for complete search history.

(56) References Cited

U.S. PATENT DOCUMENTS

| | | | | |
|---|---|---|---|---|
| 4,349,871 A | * | 9/1982 | Lary | 711/138 |
| 4,847,804 A | * | 7/1989 | Shaffer et al. | 711/119 |
| 5,606,686 A | * | 2/1997 | Tarui et al. | 711/121 |
| 6,173,370 B1 | * | 1/2001 | Tanioka | 711/143 |

(Continued)

FOREIGN PATENT DOCUMENTS

| | | |
|---|---|---|
| EP | 0779581 A2 | 6/1997 |
| EP | 2159705 A1 * | 3/2010 |

(Continued)

OTHER PUBLICATIONS

'Parallel Computer Architecture—A Hardware / Software Approach' by David Culler et al., copyright 1997 by Morgan Kaufmann Publishers.*

(Continued)

Primary Examiner — Steven Snyder
(74) Attorney, Agent, or Firm — Fujitsu Patent Center

(57) ABSTRACT

An information processing apparatus included in a parallel computer system has a memory that holds data and a processor including a cache memory that holds a part of the data held on the memory and a processor core that performs arithmetic operations using the data held on the memory or the cache memory. Moreover, the information processing apparatus has a communication device that determines whether data received from a different information processing apparatus is data that the processor core waits for. When the communication device determines that the received data is data that the processor core waits for, the communication device stores the received data on the cache memory. When the communication device determines that the received data is data that the processor core does not wait for, the communication device stores the received data on the memory.

10 Claims, 13 Drawing Sheets

(56) References Cited

U.S. PATENT DOCUMENTS

| | | | |
|---|---|---|---|
| 6,438,653 B1* | 8/2002 | Akashi et al. | 711/145 |
| 6,757,788 B2* | 6/2004 | Kawamoto et al. | 711/141 |
| 8,266,386 B2* | 9/2012 | Drerup | 711/141 |
| 8,607,024 B2* | 12/2013 | Yasufuku et al. | 711/205 |
| 8,856,478 B2* | 10/2014 | Hirano et al. | 711/166 |
| 2002/0083275 A1* | 6/2002 | Kawamoto et al. | 711/145 |
| 2002/0138699 A1 | 9/2002 | Okamura | |
| 2003/0101319 A1* | 5/2003 | Brutman et al. | 711/119 |
| 2004/0117587 A1* | 6/2004 | Arimilli et al. | 711/203 |
| 2004/0117590 A1* | 6/2004 | Arimilli et al. | 711/203 |
| 2009/0013130 A1 | 1/2009 | Tago | |
| 2011/0231593 A1* | 9/2011 | Yasufuku et al. | 711/3 |
| 2014/0297966 A1* | 10/2014 | Aoyagi et al. | 711/141 |

FOREIGN PATENT DOCUMENTS

| | | |
|---|---|---|
| JP | 06-314239 | 11/1994 |
| JP | 11-039214 | 2/1999 |
| JP | 2002-185470 | 6/2002 |
| JP | 2002-278834 | 9/2002 |
| WO | 2007/110898 | 10/2007 |

OTHER PUBLICATIONS

'A Cache Coherency Protocol for Optically Connected Parallel Computer Systems' by John A. Reisner et al., Proceedings, Second International Symposium on High-Performance Computer Architecture, 1996.*

'Design and Evaluation of Shared Memory Architecture for WDM-based λ Computing Environment' Master's Thesis by Eiji Taniguchi, Feb. 15, 2006.*

'Cache Memory' Mini-Lecture, Bob Brown, copyright 1999.*

Ram Huggahalli, et al., "Direct Cache Access for High Bandwidth Network I/O," Proceedings of the 32nd annual international symposium on Computer Architecture. 2005 IEEE.

International Search Report, mailed in connection with PCT/JP2011/058832 and mailed Jun. 28, 2011.

Extended European Search Report dated Jan. 21, 2014 for corresponding European Application No. 11863039.1.

Chinese Office Action mailed Jun. 19, 2015 for corresponding Chinese Patent Application No. 201180070697.4, with English Translation, 20 pages.

* cited by examiner

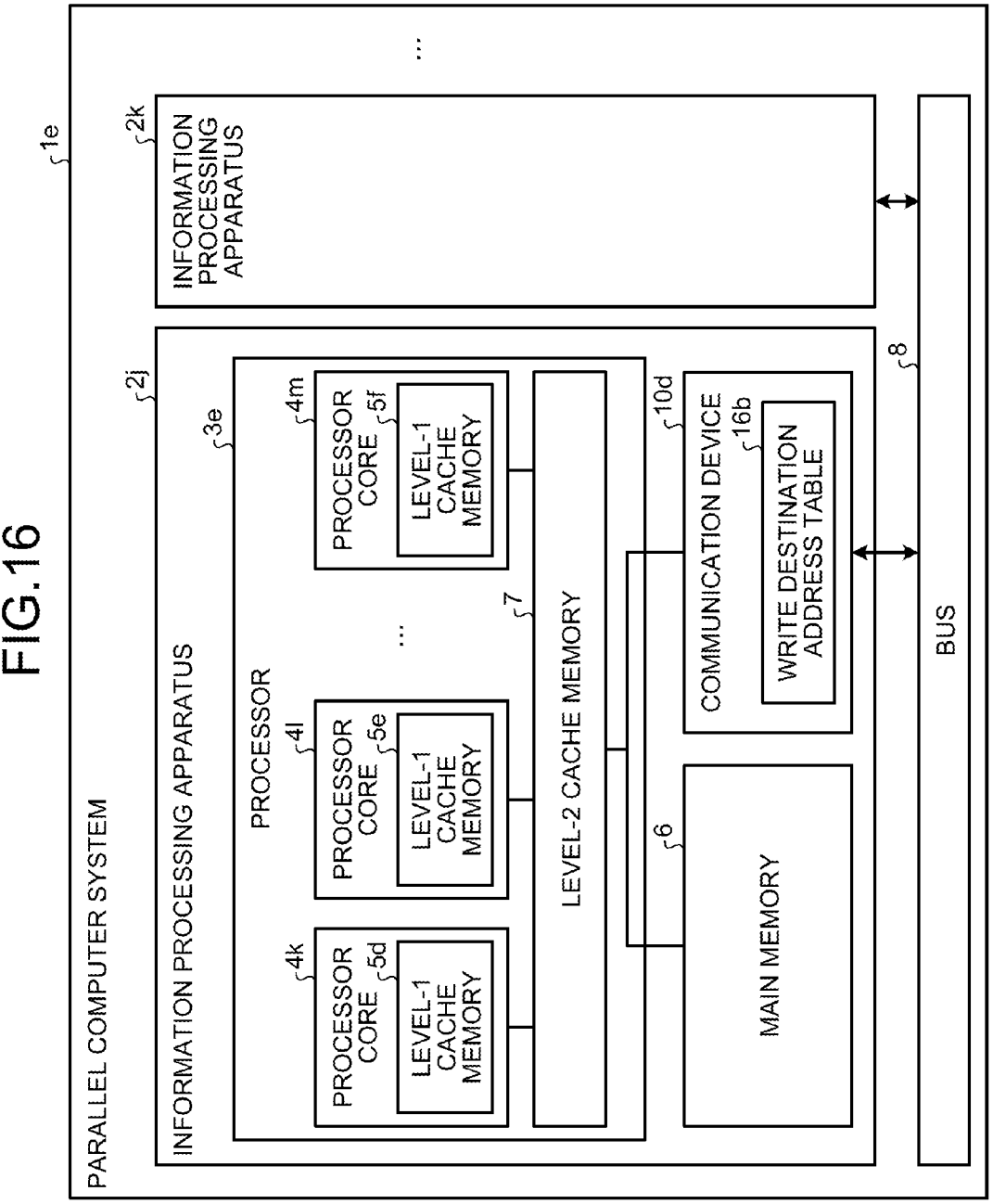

INFORMATION PROCESSING APPARATUS, PARALLEL COMPUTER SYSTEM, AND CONTROL METHOD FOR SELECTIVELY CACHING DATA

CROSS-REFERENCE TO RELATED APPLICATION

This application is a continuation application of International Application PCT/JP2011/058832, filed on Apr. 7, 2011, and designating the U.S., the entire contents of which are incorporated herein by reference.

FIELD

The present invention relates to an information processing apparatus, a parallel computer system, and a control method for an arithmetic processing unit.

BACKGROUND

Heretofore, a parallel computer system is known, in which a plurality of information processing apparatuses mutually sends and receives data and performs arithmetic operations. For an example of such a parallel computer system, a parallel computer system is known, in which a plurality of information processing apparatuses that does not share a memory space is mutually connected to each other through an interconnection network.

The information processing apparatus provided on such a parallel computer system includes a main memory that is a main storage device to store data for use in arithmetic operations, an arithmetic processing unit that performs arithmetic operations, and a communication device that sends and receives data for use in arithmetic operations with a different information processing apparatus. The communication device included in such an information processing apparatus sends and receives data involved in arithmetic operations with the different information processing apparatus through an interconnection network, and stores the received data on the main memory.

Moreover, since the arithmetic processing unit is operated at faster speed than a frequency for use in reading data out of an external main memory of the arithmetic processing unit, the arithmetic processing unit is not enabled to efficiently perform arithmetic operations as compared with the processing of data stored on a cache memory in the arithmetic processing unit, in the case where data for use in arithmetic operations is stored on the main memory. Therefore, the arithmetic processing unit includes a cache memory that can read and write data faster than the main memory does, and stores data for use in arithmetic operations on the cache memory, so that the arithmetic processing unit increases the speed to read data in performing arithmetic operations, and efficiently performs arithmetic operations.

Here, in the case where a typical communication device receives data from a different information processing apparatus, the communication device causes the arithmetic processing unit to perform a series of processes related to receiving data as an interruption process with respect to arithmetic operation processes. However, in the case where the arithmetic processing unit performs a series of processes related to receiving data as an interruption process, the arithmetic processing unit saves data held on a large number of arithmetic registers or setting registers, for example, or reconstructs saved data in association with switching processes, causing an increase in communication delay.

In the parallel computer system, a plurality of information processing apparatuses is connected to each other with interconnectors in such a way that communication delay between the information processing apparatuses falls in a predetermined delay time. Moreover, the arithmetic processing unit included in the parallel computer system repeats processes in which the arithmetic processing unit waits for the reception of data sent from a different information processing apparatus, performs arithmetic operations, and sends the result of arithmetic operations to the different information processing apparatus. Therefore, in the case where the arithmetic processing unit performs a series of processes related to receiving data as an interruption process to increase communication delay in association with switching processes, the efficiency of calculation processing in the parallel computer system is degraded.

Therefore, in the parallel computer system, in a period in which the communication device stores the data received from the different information processing apparatus on the main memory, the arithmetic processing unit performs a polling process in which the arithmetic processing unit repeatedly reads data out of memory addresses at which data is stored. Since the arithmetic processing unit performing such a polling process does not switch between processes related to receiving data and arithmetic operation processes, communication delay is reduced, and the efficiency of calculation processing is maintained.

Moreover, in the case where the arithmetic processing unit directly acquires data received at the communication device without through a buffer for receiving data, communication delay can be reduced more than in the case where data is acquired through the buffer for receiving data. However, since data volumes sent and received between the information processing apparatuses are large, it is not practical to newly provide a buffer for receiving data on the arithmetic processing unit. Therefore, such a technique is known, in which data received at the communication device is stored on a cache memory included in the arithmetic processing unit.

An information processing apparatus to which such a technique is adapted directly stores data received at the communication device from a different information processing apparatus on a cache memory included in the arithmetic processing unit. Therefore, since the arithmetic processing unit can read data for use in arithmetic operations out of the cache memory at high speed, communication delay is reduced.

Patent Document 1: Japanese Laid-open Patent Publication No. 11-039214

Patent Document 2: International Publication Pamphlet No. WO 2007/110898

Non Patent Literature 1: Ram Huggahalli and Ravi Iyer, Scott Tetrick, "*Direct Cache Access for High Bandwidth Network I/O*," ISCA '05 Proceedings of the 32nd annual international symposium on Computer Architecture However, in the foregoing technique in which the received data is stored on the cache memory included in the arithmetic processing unit, data that is not used for arithmetic operations is stored on the cache memory included in the arithmetic processing unit also in the case where data that is not used for arithmetic operations is received. Therefore, a problem arises in that it is difficult for the arithmetic processing unit to efficiently perform arithmetic operations and calculation processing speed is reduced.

In other words, in storing data used for arithmetic operations on the cache memory, the information processing apparatus sometimes discharges data used for arithmetic operations out of the cache memory in order to store received data on the cache memory in the case of receiving new data. In this case, since the information processing apparatus reads data, which is discharged from the cache memory, out of the main memory in order to perform arithmetic operations, it is difficult for the information processing apparatus to efficiently perform arithmetic operations, and calculation processing speed is reduced.

SUMMARY

According to an aspect, an information processing apparatus included in a parallel computer system including a plurality of information processing apparatuses. The information processing apparatus includes a main storage device that holds data and an arithmetic processing unit including a cache memory unit that holds a part of data held on the main storage device and an arithmetic operation unit that performs arithmetic operations using data held on the main storage device or the cache memory unit. The information processing apparatus includes a communication device that determines whether data received from a different information processing apparatus is data that the arithmetic processing unit waits for, and when the communication device determines that the received data is data that the arithmetic processing unit waits for, stores the received data on the cache memory unit. The communication device stores the received data on the main storage device when the communication device determines that the received data is data that the arithmetic processing unit does not wait for.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram illustrating the parallel computer system according to the sixth embodiment.

DESCRIPTION OF EMBODIMENTS

In the following, an information processing apparatus, a parallel computer system, and a control method for an arithmetic processing unit according to the present application will be described with reference to the accompanying drawings. It is noted that the embodiments described below can be appropriately combined as long as there is no discrepancy.

First Embodiment

Figure 1:
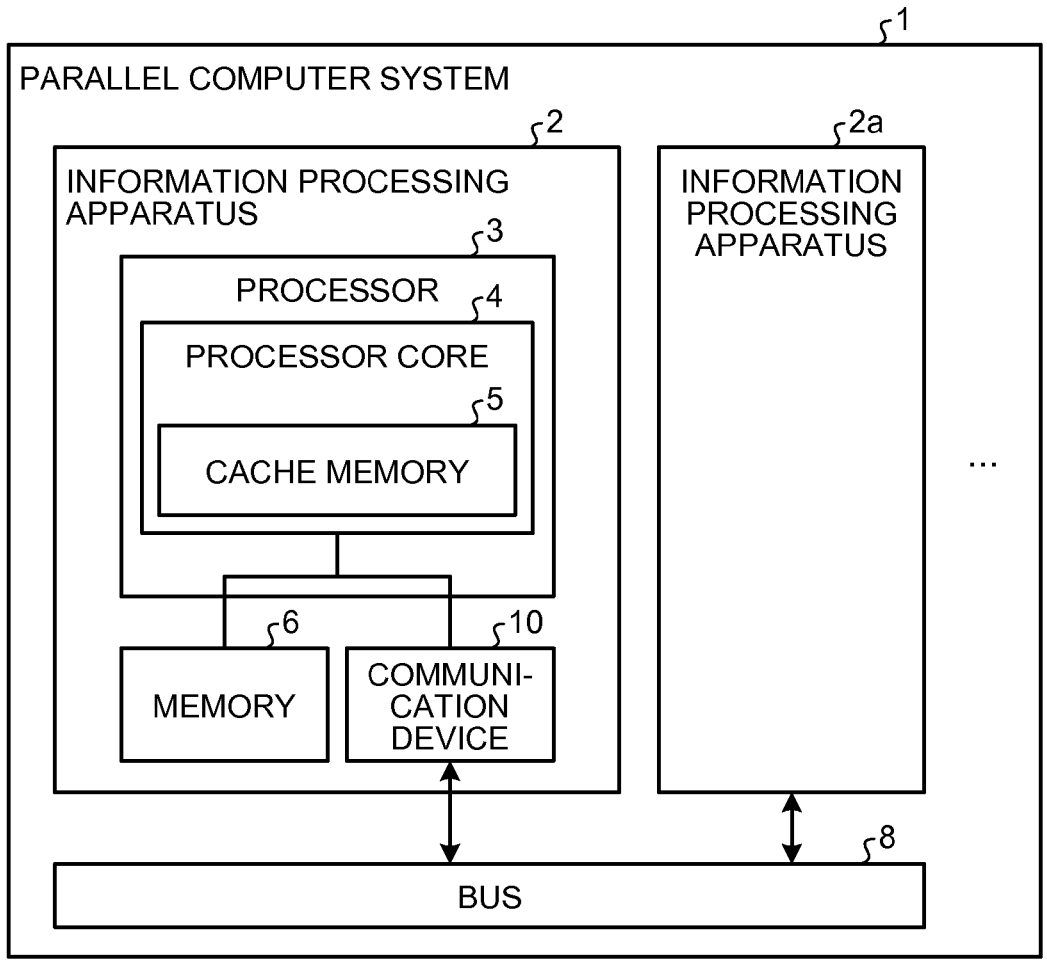
FIG. 1 is a diagram illustrating a parallel computer system according to a first embodiment.

In a first embodiment below, an exemplary parallel computer system will be described with reference to FIG. 1. FIG. 1 is a diagram illustrating a parallel computer system according to the first embodiment.

As illustrated in FIG. 1, a parallel computer system 1 includes a plurality of information processing apparatuses 2 and 2a and a bus 8 that connects the information processing apparatuses 2 and 2a to each other. It is noted that in the example illustrated in FIG. 1, the information processing apparatuses 2 and 2a are illustrated. However, the parallel computer system 1 may include a large number of information processing apparatuses. The parallel computer system 1 may include a given number of information processing apparatuses. Moreover, in the description below, the description of the information processing apparatus 2a is omitted because the information processing apparatus 2a performs processes as similar to the processes of the information processing apparatus 2.

The information processing apparatus 2 includes a processor 3, a memory 6, and a communication device 10. The processor 3, the memory 6, and the communication device 10 are connected to each other with the bus included in the information processing apparatus 2. The processor 3 is an arithmetic processing unit that performs arithmetic operations. More specifically, the processor 3 includes a processor core 4 that performs arithmetic operations. Moreover, the processor core 4 includes a cache memory 5.

In the following, data to be stored on the memory 6 and the cache memory 5 will be described, and then processes performed by the processor core 4 and the communication device 10 will be described.

Figure 2:
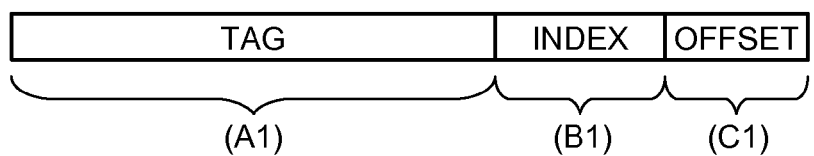
FIG. 2 is a diagram illustrating an exemplary memory address.

The memory 6 is a main memory included in the information processing apparatus 2, and holds data for use in arithmetic operations at the processor core 4. In the following, an exemplary memory 6 will be described with reference to FIGS. 2 and 3. FIG. 2 is a diagram illustrating an exemplary memory address. For example, the memory address indicating the storage region of the memory 6 is a memory address having a 40 bit length, for example, in the case where the processor 3 has a 40 bit memory address space. In this case, the memory address can be split, for example, in such a way that higher-order "34−N" bits in a range illustrated in (A1) in FIG. 2 are allocated for a tag, subsequent "N" bits in a range illustrated in (B1) in FIG. 2 are allocated for an index, and low-order "six" bits in a range illustrated in (C1) in FIG. 2 are allocated for an offset. Here, suppose that a given number of bits can be set to the size of the index. In the description below, "N" bits are set as the index.

Figure 3:
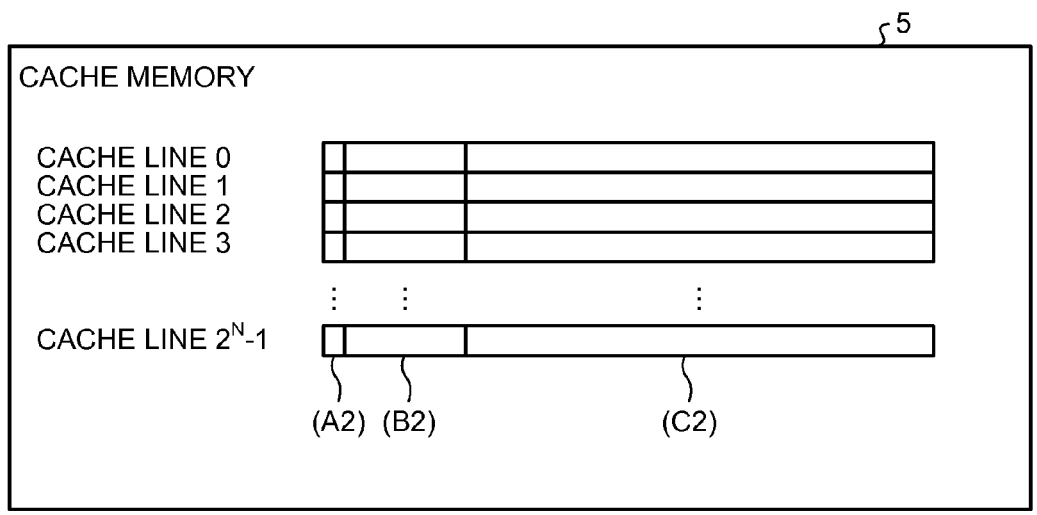
FIG. 3 is a diagram illustrating an exemplary cache memory according to the first embodiment.

The cache memory 5 is a storage device that stores data for use in arithmetic operations at the processor core, and can input and output data at higher speed than the memory 6 does. In the following, an exemplary cache memory 5 will be described. FIG. 3 is a diagram illustrating an exemplary cache memory according to the first embodiment. For example, the cache memory 5 is a cache memory that has 2N cache lines having a line size of 64 bytes and has an overall capacity of 2N+6 bytes.

Here, cache line numbers "0" to "2N−1" are allocated to the cache lines. Moreover, on the cache lines, two bits of state data illustrated in (A2) in FIG. 3, "34−N" bits of tag data illustrated in (B2) in FIG. 3, and 64 bytes of data illustrated in (C2) in FIG. 3 are stored. Here, one bit of the state data is a Valid bit indicating whether data stored on the corresponding cache line is valid. For example, in the case where "1" is stored on the Valid bit, this indicates that data stored on the corresponding cache line is valid, whereas in the case where "0" is stored on the Valid bit, this indicates that data stored on the corresponding cache line is invalid.

Moreover, the other bit of the state data is a Dirty bit that is information to maintain the consistency between data stored on the corresponding cache line and data stored on the memory 6. For example, in the case where "1" is stored on the Dirty bit, this indicates that it is necessary to again write data on the memory 6 because data stored on the corresponding cache line is updated at the processor core 4. In the case where "0" is stored on the Dirty bit, this indicates that data stored on the cache line and data stored on the memory 6 are the same because data stored on the corresponding cache line is not updated at the processor core 4. For example, data stored on the cache line on which the Valid bit is "1" and the Dirty bit is "1" is valid data, and the data stored on the cache line is not the same as data stored on the memory 6 that is a source cache because of the overwrite by the processor core 4, for example.

Furthermore, a direct mapping method is adopted for the cache memory 5. In the case where data on the memory 6 is to be cached, the data is stored on a cache line corresponding to the index of the memory address at which data on a source cache is stored. For example, in the case where the index of the memory address at which data on the source cache is stored is "i", the cache memory 5 stores the data on a cache line having a cache line number "i". However, a set associative method having a plurality of cache ways may be adopted for the cache memory 5.

Now again referring to FIG. 1, the processor core 4 is an arithmetic operation unit that performs arithmetic operations using data. More specifically, the processor core 4 performs arithmetic operations using data stored on the memory 6 or the cache memory 5. Moreover, the processor core 4 acquires data stored on the memory 6, and stores the acquired data on the cache memory 5. Namely, the processor core 4 holds data, which is stored on the memory 6, on the cache memory 5. The processor core 4 then performs arithmetic operations using data stored on the cache memory 5.

Furthermore, in the case where the processor core 4 performs arithmetic operations using the result of arithmetic operations made by a different information processing apparatus such as the information processing apparatus 2a, the processor core 4 waits until the communication device 10 receives data sent from the different information processing apparatus. In other words, the processor core 4 performs a polling process that data of the result of arithmetic operations made by the different information processing apparatus. In the case where the communication device 10 receives data to be subjected to the polling process, the processor core 4 then acquires the received data, and stores the acquired data on the cache memory 5 and the memory 6.

Here, an exemplary process that the processor core 4 stores received data on the cache memory 5 and the memory 6 will be described. For example, in the case where the processor core 4 receives data to be stored on the memory 6 from the communication device 10, described later, the processor core 4 stores the received data on the memory 6.

Moreover, in the case where the processor core 4 receives data from the communication device 10 as data to be written on the cache memory 5, the processor core 4 performs the following process. Namely, the processor core 4 stores the received data on the memory 6, as well as stores the received data on the cache memory 5. In other words, in the case where the processor core 4 receives data from the communication device 10 as data to be stored on the cache memory 5, the processor core 4 stores the received data on the cache memory 5 and the memory 6.

Here, in the case where the processor core 4 stores the received data on the cache memory 5, the processor core 4 makes reference to information to maintain the consistency between data stored on the cache memory 5 and data stored on the memory 6. The processor core 4 discharges data stored on the cache memory 5 on the memory 6 based on the referenced information to maintain the consistency, and then stores the received data on the cache memory 5. After the storing, the processor core 4 performs arithmetic operations using the data stored on the cache memory 5, that is, using data to be subjected to the polling process.

Moreover, in the case where the processor core 4 sends the calculated data to a different information processing apparatus as a result of arithmetic operations, the processor core 4 sends information indicating a destination information processing apparatus and the calculated data to the communication device 10. In the sending, the processor core 4 determines whether the calculated data is data that the processor core included in the different information processing apparatus waits for. In the case where the processor core 4 determines that the calculated data is data that the processor core included in the different information processing apparatus waits for, the processor core 4 sends a message indicating that the calculated data is data that the processor core waits for to the communication device 10.

Next, exemplary processes performed by the processor core 4 will be described. For example, in the case where the processor core 4 receives data from the communication device 10 as data to be stored on the memory 6, the processor core 4 performs the following process. Namely, the processor core 4 makes reference to the Valid bit and the Dirty bit which are the state data of the cache line corresponding to the index of the memory address at which data is to be stored. When the referenced Valid bit is "1" and the referenced Dirty bit is "1", the processor core 4 performs the following process.

Namely, the processor core 4 updates data on the source cache stored on the memory 6 to the latest data using cached data stored on the cache memory 5. The processor core 4 updates the referenced Valid bit from "1" to "0", and then stores the data received from the communication device 10 on the memory address of the memory 6 received together with the data.

Moreover, in the case where the referenced Valid bit is "0", or in the case where the Valid bit is "1" and the Dirty bit is "0", the processor core 4 updates the Valid bit to "0", and stores the received data on the memory 6.

Next, the case will be described where the processor core 4 receives data from the communication device 10 as data to be stored on the cache memory 5. In this case, the processor core 4 makes reference to the Valid bit, the Dirty bit, and the tag data of the cache line on which the received data is to be stored. In other words, the processor core 4 makes reference to the Valid bit and the Dirty bit of the cache line corresponding to the index of the memory address at which the received data is to be stored. In the case where the referenced Valid bit is "0" or in the case where the referenced tag data is not matched with the tag data of the received memory address, the processor core 4 stores the received data on the memory 6.

Moreover, in the case where the referenced Valid bit is "1" and the referenced tag data is matched with the tag of the memory address at which the received data is to be stored, the processor core 4 performs the following process. Namely, the processor core 4 stores data received from the communication device 10 on the cache line to which the state data and the tag data are referenced.

Now again referring to FIG. 1, the communication device 10 receives packetized data from a different information processing apparatus such as the information processing apparatus 2a through the bus 8. Here, the packetized data stores data and the memory address of the memory 6 at which data is to be stored. In the case where the communication device 10 receives data from the different information processing apparatus 2a, the communication device 10 determines whether the received data is data that the processor core 4 waits for.

In the case where the communication device 10 determines that the received data is data that the processor core 4 waits for, the communication device 10 sends the data as data to be stored on the cache memory 5 to the processor core 4. In other words, the communication device 10 sends the data as data to be stored on the cache memory 5 to the processor core 4, and stores the received data on the cache memory 5 and the memory 6.

On the other hand, in the case where the communication device 10 determines that the received data is not data that the processor core 4 waits for, the communication device 10 sends the data as data to be stored on the memory 6 to the processor core 4. In other words, the communication device 10 sends the data as data to be stored on the memory 6 to the processor core 4, and stores the received data on the main memory 6.

Moreover, in the case where the communication device 10 receives data and information indicating the different information processing apparatus 2a of destination from the processor core 4, the communication device 10 packetizes the received data, and sends the packet to the different information processing apparatus 2a of destination through the bus 8. Furthermore, in the case where the communication device 10 receives a message indicating that data is data that a processor included in the different information processing apparatus 2a waits for from the processor core 4, the communication device 10 packetizes the received data, and adds, to the packet, control information indicating that the packet is to be subjected to the polling process. The communication device 10 then sends the packet added with the control information to the different information processing apparatus 2a of destination.

Figure 4:
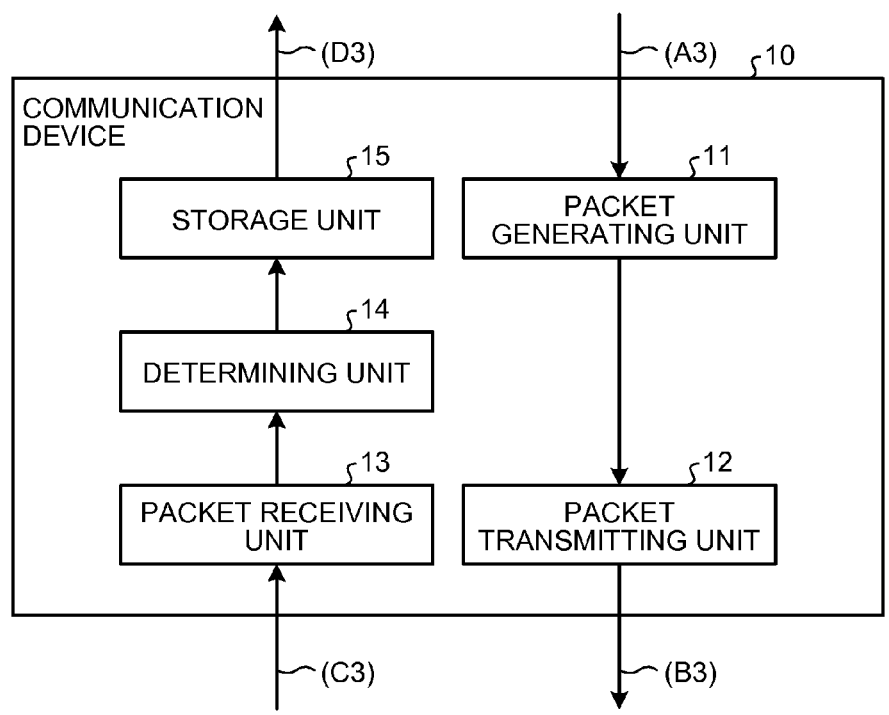
FIG. 4 is a diagram illustrating an exemplary communication device according to the first embodiment.

In the following, an exemplary communication device 10 will be described with reference to FIG. 4. FIG. 4 is a diagram illustrating an exemplary communication device according to the first embodiment. In the example illustrated in FIG. 4, the communication device 10 includes a packet generating unit 11, a packet transmitting unit 12, a packet receiving unit 13, a determining unit 14, and a storage unit 15.

As illustrated in (A3) in FIG. 4, in the case where the packet generating unit 11 sends data that a processor core included in the different information processing apparatus 2a waits for, the packet generating unit 11 performs the following process. Namely, the packet generating unit 11 packetizes data to be sent, and stores, in the packet, the different information processing apparatus 2a of destination and the memory address of a memory included in the different information processing apparatus 2a of destination at which data is to be stored, for example. Moreover, the packet generating unit 11 adds, to the packet, control information indicating that data is to be written on a cache memory included in the processor core of the different information processing apparatus 2a. The packet generating unit 11 then sends the generated packet to the packet transmitting unit 12.

Figure 5:
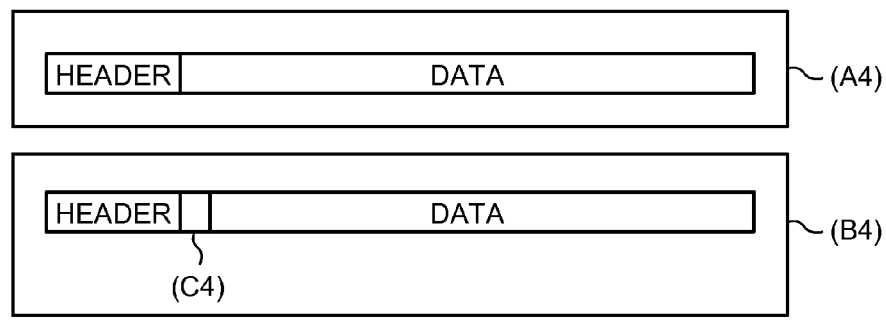
FIG. 5 is a diagram illustrating an exemplary packet generated at a packet generating unit according to the first embodiment.

Here, FIG. 5 is a diagram illustrating an exemplary packet generated at the packet generating unit according to the first embodiment. As illustrated in (A4) in FIG. 5, a previously existing packet includes a header portion on which an address indicating the different information processing apparatus 2a of destination is stored and a data portion on which data is stored. On the other hand, the packet generating unit 11 generates a packet illustrated in (B4) in FIG. 5. More specifically, the packet generating unit 11 adds one bit of a flag region on which control information is stored between a header and data in the packet as illustrated in (C4) in FIG. 5.

In the case where data to be sent is data that the processor core of the different information processing apparatus 2a of destination waits for, the packet generating unit 11 stores "1" on the flag region as control information. Moreover, in the case where data to be sent is not data that the processor core of the destination information processing apparatus waits for, the packet generating unit 11 stores "0" on the flag region as control information. It is noted that the information processing apparatus 2 generates the packet having the control information stored as well as a different information processing apparatus such as the information processing apparatus 2a generates similar packets.

Now again referring to FIG. 4, as illustrated in (B3) in FIG. 4, in the case where the packet transmitting unit 12 receives the packet generated at the packet generating unit 11, the packet transmitting unit 12 sends the packet to the different information processing apparatus of destination such as the different information processing apparatus 2a through the bus 8.

As illustrated in (C3) in FIG. 4, in the case where the packet receiving unit 13 receives the packet through the bus 8, the packet receiving unit 13 transfers the received packet to the determining unit 14. The determining unit 14 determines whether "1" is stored on the flag region of the received packet.

In the case where "1" is stored on the flag region of the packet, the determining unit 14 determines that data stored in the packet is data to be stored on the cache memory 5. Moreover, in the case where "0" is stored on the flag region of the packet, the determining unit 14 determines that data stored in the packet is data to be stored on the memory 6. After the determination, the determining unit 14 sends the determined content and the data stored in the packet to the storage unit 15.

In the case where the determining unit 14 determines that data stored in the packet is data to be stored on the cache memory 5, the storage unit 15 performs the following process. Namely, as illustrated in (D3) in FIG. 4, the storage unit 15 sends, to the processor core 4, the data stored in the packet as data to be stored on the cache memory 5 and the memory 6. Furthermore, in the case where the determining unit 14 determines that data stored in the packet is data to be stored on the memory 6, the storage unit 15 sends, to the processor core 4, the data stored in the packet as data to be stored on the memory 6.

More specifically, in the case where "1" is stored on the flag region of the packet, the storage unit 15 sends, to the processor core 4, the data received from the determining unit 14 and a notification indicating that the data is to be stored on the cache memory 5. Moreover, in the case where "0" is stored on the flag region of the packet, the storage unit 15 sends data to the processor core 4. In other words, the storage unit 15 sends, to the processor core 4, the received data as data to be stored on the memory 6.

As described above, in the case where the communication device 10 sends data that the processor core included in the different information processing apparatus 2a waits for, that is, in the case where the communication device 10 sends data to be subjected to polling, the communication device 10 performs the following process. Namely, the communication device 10 stores "1" on the flag region of the packet to be sent as control information, and sends the packet to the different information processing apparatus 2a of destination. Moreover, also in the case where a communication device included in a different information processing apparatus such as the information processing apparatus 2a sends data that the processor core 4 waits for, the communication device sends a packet in which "1" is stored on the flag region.

In the case where "1" is stored on the flag region of the received packet, the communication device 10 sends, to the processor core 4, data stored in the received packet as data to be written on the cache memory 5. In the case where data stored at the memory address at which the received data is to be written is cached on the cache memory 5 in data stored on the memory 6, the processor core 4 caches the data received from the communication device 10 on the cache memory 5. Therefore, the processor core 4 can read data waited for out of the cache memory 5, not out of the memory 6, so that the processor core 4 can efficiently perform arithmetic operations.

On the other hand, in the case where "0" is stored on the flag region of the received packet, the communication device 10 sends, to the processor core 4, data stored in the received packet as data to be written on the memory 6. In this case, the processor core 4 writes data on the memory 6. In other words, only in the case where the information processing apparatus 2 receives data that the processor core 4 waits for from the different information processing apparatus 2a, the information processing apparatus 2 stores the data on the cache memory 5 included in the processor core 4, and stores other data on the memory 6. Therefore, as a result of preventing that data for use in arithmetic operations stored on the cache memory 5 is discharged due to data that is uncertain for use in arithmetic operations, the parallel computer system 1 can prevent a reduction in calculation processing speed.

For example, the processor 3, the processor core 4, the packet generating unit 11, the packet transmitting unit 12, the packet receiving unit 13, the determining unit 14, and the storage unit 15 are implemented using an integrated circuit such as an LSI (Large Scale Integrated circuit), for example.

Moreover, the memory 6 is a semiconductor memory device such as RAM (Random Access Memory), ROM (Read Only Memory), and flash memory. Furthermore, the cache memory 5 is an internal memory of the processor core 4.

Process Flow of the Communication Device 10

Figure 6:
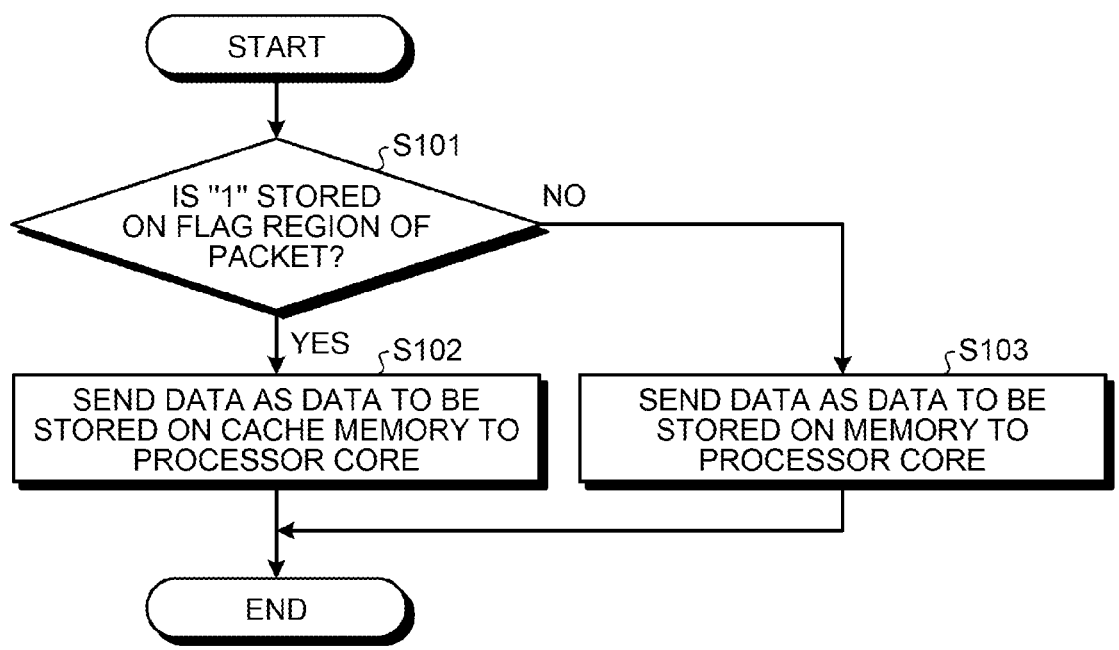
FIG. 6 is a flowchart illustrating a process flow performed by the communication device according to the first embodiment.

Next, a process flow performed by the communication device 10 will be described with reference to FIG. 6. FIG. 6 is a flowchart illustrating a process flow performed by the communication device according to the first embodiment. In the example illustrated in FIG. 6, the communication device 10 starts processes at a trigger that the communication device 10 receives a packet whose destination is the information processing apparatus 2 through the bus 8.

First, the communication device 10 determines whether "1" is stored on the flag region of the received packet (Step S101). In the case where "1" is stored on the flag region of the received packet (yes in Step S101), the communication device 10 sends, to the processor core 4, data stored in the received packet as data to be stored on the cache memory 5 (Step S102). On the other hand, in the case where "0" is stored on the flag region of the received packet (no in Step S101), the communication device 10 sends, to the processor core 4, data stored in the received packet as data to be stored on the memory 6 (Step S103). After the sending, the communication device 10 ends the processes.

Effect of the First Embodiment

As described above, in the case where the information processing apparatus 2 receives data from the different information processing apparatus 2a, the information processing apparatus 2 determines whether the processor core 4 waits for the received data. In the case where the information processing apparatus 2 determines that the processor core 4 waits for the received data, the information processing apparatus 2 stores the received data on the cache memory 5. Moreover, in the case where the information processing apparatus 2 determines that the processor core 4 does not wait for the received data, the information processing apparatus 2 stores the received data on the memory 6, not on the cache memory 5.

Therefore, when the information processing apparatus 2 receives data that is not used for arithmetic operations at the processor core 4, the information processing apparatus 2 prevents data stored on the cache memory 5 from being discharged. As a result, the processor cores included in the information processing apparatuses 2 and 2a can perform efficient processing using data stored on the cache memories, so that the parallel computer system 1 can prevent a reduction in calculation processing speed.

Moreover, in the case where the information processing apparatuses 2 and 2a send data that the processor cores included in the different information processing apparatuses wait for, the information processing apparatuses 2 and 2a store control information indicating that the processor cores wait for the data in a packet to be sent. In the case where the control information is stored in the received packet, the information processing apparatuses 2 and 2a store data in the received packet on the cache memory 5. Furthermore, in the case where the control information is not stored in the received packet, the information processing apparatuses 2 and 2a store data in the received packet on the memory 6. Accordingly, the information processing apparatuses 2 and 2a can easily determine whether to store the received data on the cache memory.

Second Embodiment

Figure 7:
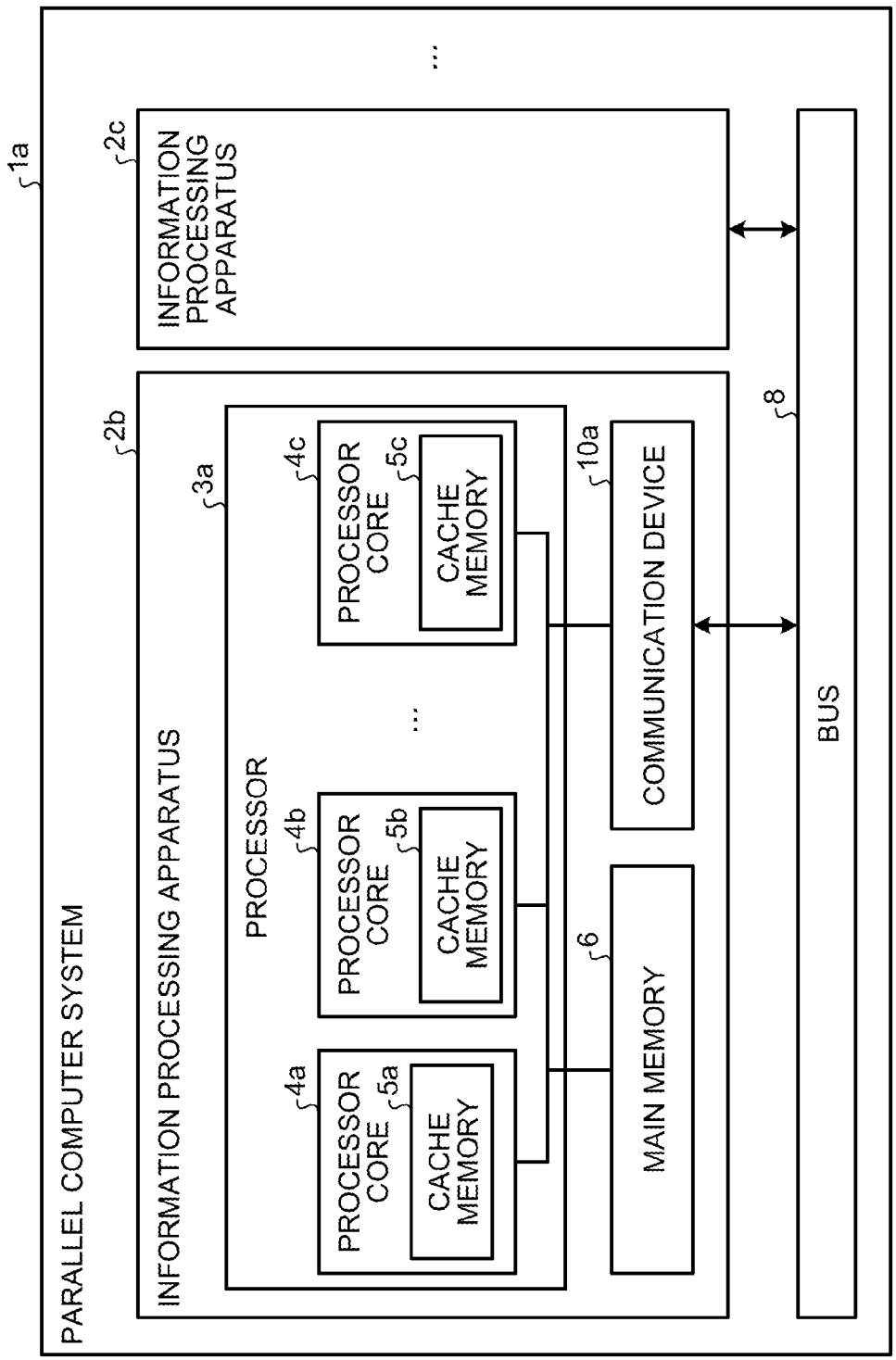
FIG. 7 is a diagram illustrating an exemplary parallel computer system according to a second embodiment.

In a second embodiment, a parallel computer system including a plurality of information processing apparatuses each provided with a processor including a plurality of processor cores will be described. FIG. 7 is a diagram illustrating an exemplary parallel computer system according to the second embodiment. In the example illustrated in FIG. 7, a parallel computer system 1a includes a plurality of information processing apparatuses 2b and 2c. It is noted that the description of the information processing apparatus 2c is omitted because the information processing apparatus 2c performs processes as similar to the processes of the information processing apparatus 2b.

Moreover, in the units included in the information processing apparatus 2b, units exerting similar functions as the units included in the information processing apparatus 2 are designated the same reference numerals and signs, and the description is omitted below.

The information processing apparatus 2b includes a processor 3a. Moreover, the processor 3a includes a plurality of processor cores 4a to 4c. It is noted that a given number of processor cores is provided on the processor 3a. The processor cores 4a to 4c individually include cache memories 5a to 5c. It is noted that in the description below, the description of the processor cores 4b and 4c is omitted because the processor cores 4b and 4c exert functions as similar to the functions of the processor core 4a. Moreover, the description of the cache memories 5b and 5c is omitted because the cache memories 5b and 5c exert functions as similar to the functions of the cache memory 5a.

The cache memory 5a includes a plurality of cache lines that stores state data, tag data, and data as similar to the cache memory 5 according to the first embodiment. Here, the cache memory 5 stores consistency information indicating the relationship between data stored on the same cache line on which tag information is stored, data stored on different cache memories 5b and 5c, and data stored on the memory 6.

For example, the cache memory 5 stores information indicating the state of the cache line as state data based on the MESI protocol (Illinois protocol). In detail, in the case where "M: Modify" is stored in state data, this indicates that data stored on the same cache line is exclusively cached and that the cached data is updated to the latest state by the processor core 4a.

Moreover, in the case where "E: Exclusive" is stored in state data, this indicates the state that data stored on the same cache line is exclusively cached and that the cached data is not updated by the processor core 4a. Furthermore, in the case where "S: Shared" is stored in state data, this indicates that the different cache memories 5b and 5c cache the same shared data. In addition, in the case where "I: Invalid" is stored in state data, this indicates that data on the same cache line is invalid.

In the case where a communication device 10a receives data that the processor cores 4a to 4c do not wait for, the processor core 4a stores the received data on the memory 6. Moreover, in the case where the communication device 10a receives data that the processor core 4a waits for and data stored at the memory address of the memory 6 at which the received data is to be stored is held on the cache memory 5a, the processor core 4a performs the following process.

Namely, the processor core 4a determines whether data held on the cache memory 5a is cached on different processor cores 4b and 4c. In the case where the processor core 4a determines that the data is cached, the processor core 4a stores the received data on the memory 6. Moreover, in the case where the processor core 4a determines that data held on the cache memory 5a is not cached on the different processor cores 4b and 4c, the processor core 4a stores the received data only on the cache memory 5a.

Next, exemplary processes performed by the processor core 4a will be described. For example, in the case where the processor core 4a receives data from the communication device 10a as data to be stored on the memory 6, the processor core 4a performs the following process. Namely, the processor core 4a makes reference to the state data of the cache line of the cache memory 5a corresponding to the index of the memory address of the memory 6 at which the received data is to be stored.

In the case where "M" is stored in the referenced state data, the processor core 4a writes, on the memory 6, data stored on the same cache line on which the referenced state data is stored. Subsequently, the processor core 4a updates the referenced state data from "M" to "I". After the update, the processor core 4a stores the received data on the memory 6. Moreover, in the case where the referenced state data is not "M", the processor core 4a updates the referenced state data to "I", and stores the received data on the memory 6.

On the other hand, in the case where the processor core 4a receives data from the communication device 10a as data to be stored on the cache memory, the processor core 4a performs the following process. Namely, the processor core 4a makes reference to the state data and the tag data of the cache line of the cache memory 5a corresponding to the index of the memory address of the memory 6 at which the received data is to be stored.

In the case where "I" is stored in the referenced state data, or in the case where the tag of the memory address at which the received data is to be stored is not matched with the referenced tag data, the processor core 4a stores the received data on the memory 6. Furthermore, in the case where "S" is stored in the referenced state data and the tag of the memory address at which the received data is to be stored is matched with the referenced tag data, the processor core 4a stores the received data on the memory 6, and updates the referenced state data from "S" to "I".

In addition, in the case where the referenced state data is "M" or "E" and the tag of the memory address at which the received data is to be stored is matched with the referenced tag data, the processor core 4a performs the following process. Namely, the processor core 4a stores the received data on the cache memory 5a, and updates the referenced state data to "M".

In other words, in the case where the processor cores 4a to 4c receive data from the communication device 10a as data to be stored on the cache memory, the processor cores 4a to 4c make reference to the state data and the tag data of the cache line corresponding to the index of the memory address at which the received data is to be stored. The processor cores 4a to 4c then determine from the referenced state data and the referenced tag data whether the received data is data to be subjected to the polling process at the processor cores 4a to 4c and data stored at the memory address at which the received data is to be stored is held on the cache memories of the processor cores 4a to 4c. In other words, the processor cores 4a to 4c determine whether the cache memories of the processor cores 4a to 4c are subjected to the polling process.

In the case where the communication device 10a receives a packet from a different information processing apparatus such as the information processing apparatus 2c, the communication device 10a determines whether "1" is stored on the flag region of the received packet. In the case where "1" is stored on the flag region of the received packet, the communication device 10a performs the following process. Namely, the communication device 10a sends the received data as data to be held on the cache memory to the processor cores 4a to 4c.

On the other hand, in the case where "0" is stored on the flag region of the received packet, the communication device 10a sends the received data as data to be stored on the memory 6 to the processor cores 4a to 4c.

Figure 8:
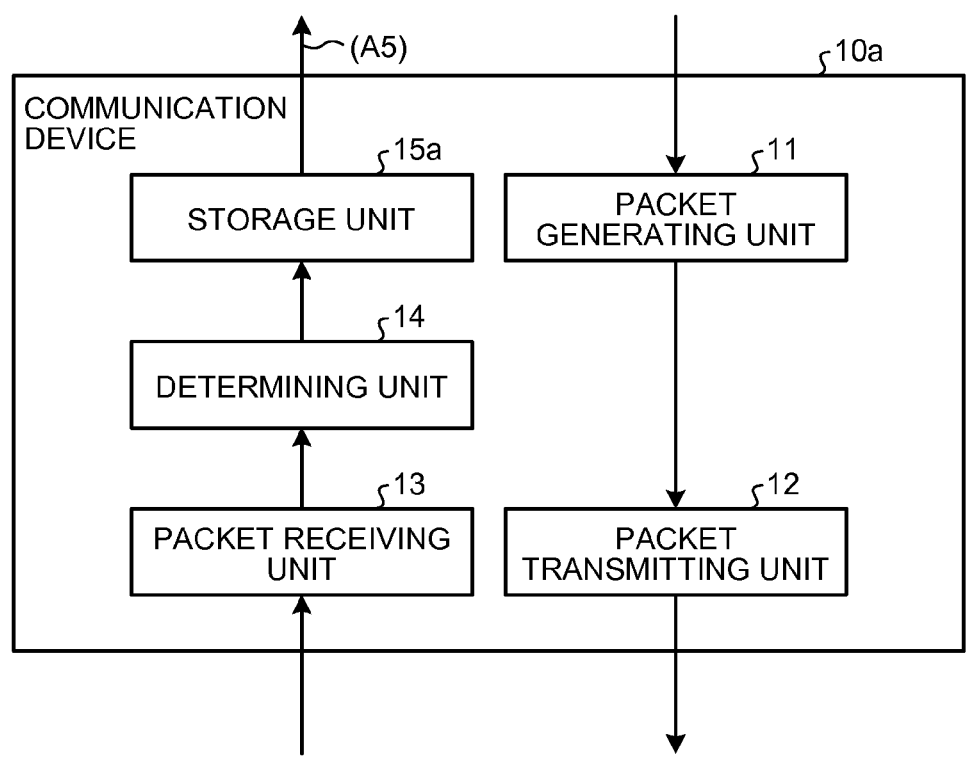
FIG. 8 is a diagram illustrating a communication device according to the second embodiment.

Next, the units included in the communication device 10a will be described with reference to FIG. 8. FIG. 8 is a diagram illustrating the communication device according to the second embodiment. In the example illustrated in FIG. 8, the communication device 10a includes a packet generating unit 11, a packet transmitting unit 12, a packet receiving unit 13, a determining unit 14, and a storage unit 15a.

In the case where the determining unit 14 determines that "1" is stored on the flag region of the packet, the storage unit 15a sends the received data as data to be cached on the cache memory to the processor cores 4a to 4c as illustrated in (A5) in FIG. 8. In other words, in the case where the determining unit 14 determines that "1" is stored on the flag region of the packet, the storage unit 15a stores the received data on the cache memory that holds data stored at the memory address of the memory 6 at which the received data is to be stored.

Moreover, in the case where the determining unit 14 determines that "0" is stored on the flag region of the packet, the storage unit 15a sends the received data as data to be stored on the memory 6 to the processor cores 4a to 4c, as illustrated in (A5) in FIG. 8. In other words, in the case where the determining unit 14 determines that "0" is stored on the flag region of the packet, the storage unit 15a stores the received data on the memory 6.

Effect of the Second Embodiment

As described above, the information processing apparatus 2b includes the processor 3a having a plurality of the processor cores 4a to 4c. Moreover, the processor cores 4a to 4c individually include the cache memories 5a to 5c. In the case where the information processing apparatus 2b receives a packet from a different information processing apparatus such as the information processing apparatus 2c, the information processing apparatus 2b determines whether "1" is stored on the flag region of the received packet as control information. In the case where "1" is stored as control information, the information processing apparatus 2b stores data in the received packet on the cache memory that caches data stored at the memory address of the memory 6 at which data in the received packet is to be stored. Furthermore, in the case where "0" is stored as control information, the information processing apparatus 2b stores data in the received packet on the memory 6.

Therefore, in the case where the information processing apparatus 2b receives data to be subjected to the polling process at the processor cores 4a to 4c, the information processing apparatus 2b can directly store the received data on the cache memories 5a to 5c. Thus, also in the case where the processor 3a is a multi-core processor including a plurality of the processor cores 4a to 4c, the information processing apparatus 2b can cause the processor 3a to efficiently perform arithmetic operations.

Moreover, in the case where the information processing apparatus 2b receives data that is not subjected to the polling process at the processor cores 4a to 4c, the information processing apparatus 2b stores the received data on the memory 6. Therefore, the information processing apparatus 2b can prevent data for use in arithmetic operations at the processor cores 4a to 4c from being discharged out of the cache memories 5a to 5c caused by the received data. Thus, the parallel computer system 1a can cause the processor 3a to efficiently perform arithmetic operations without reducing calculation processing speed.

Furthermore, the cache memories 5a to 5c store consistency information indicating the relationship between data stored on the cache memories 5a to 5c, data stored on different cache memories 5a to 5c, and data stored on the memory 6. In the case where the processor cores 4a to 4c receive data as data to be stored on the cache memory, the processor cores 4a to 4c individually maintain consistency information about data cached on the cache memories 5a to 5c of the processor cores 4a to 4c and data stored at the memory address at which the received data is to be stored.

In the maintaining, the processor cores 4a to 4c maintain the consistency between cached data and data stored on the memory 6 based on consistency information stored on the cache memories 5a to 5c of the processor cores 4a to 4c. After the maintaining, the processor cores 4a to 4c store the data received from the communication device 10 on the cache memories 5a to 5c. Accordingly, also in the case where the processor cores 4a to 4c include the cache memories 5a to 5c of the processor cores 4a to 4c, the parallel computer system 1a can maintain data coherency, and can cause the information processing apparatuses 2b and 2c to perform appropriate arithmetic operations.

Third Embodiment

Figure 9:
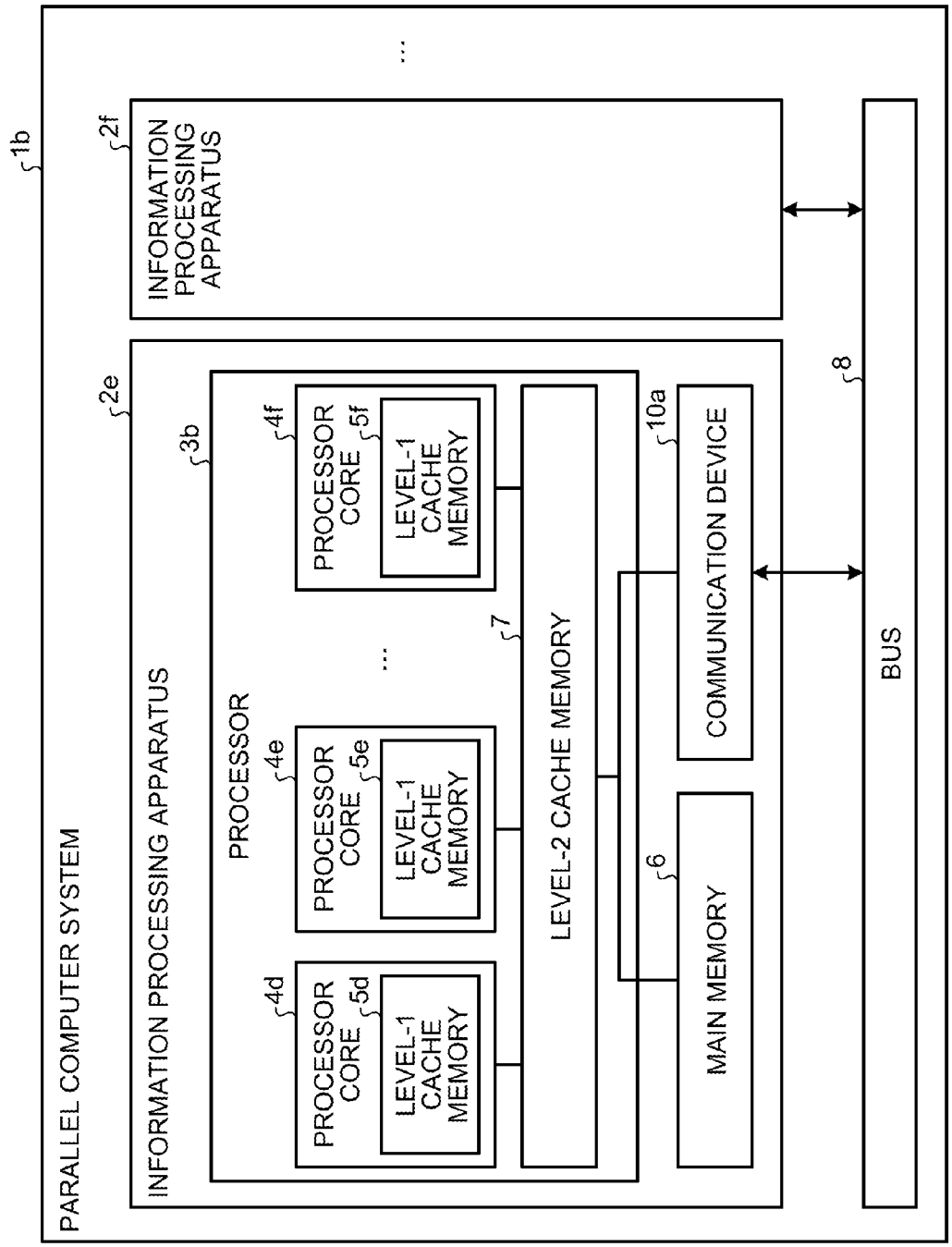
FIG. 9 is a diagram illustrating an exemplary parallel computer system according to a third embodiment.

In a third embodiment, a parallel computer system including a plurality of information processing apparatuses provided with a processor including a plurality of processor cores each having their own L1 cache memory and a single L2 cache memory shared between the processor cores will be described. FIG. 9 is a diagram illustrating an exemplary parallel computer system according to the third embodiment. In the example illustrated in FIG. 9, a parallel computer system 1b includes a plurality of information processing apparatuses 2e and 2f. It is noted that the description of the information processing apparatus 2f is omitted because the information processing apparatus 2f performs processes as similar to the processes of the information processing apparatus 2e.

Moreover, in the units included in the parallel computer system 1b, units exerting similar functions as the units included in the parallel computer system 1a are designated the same reference numerals and signs, and the description is omitted below.

The information processing apparatus 2e includes a processor 3b. Moreover, the processor 3b includes a plurality of processor cores 4d to 4f and a level-2 cache memory 7 shared between the processor cores 4d to 4f. Furthermore, the processor cores 4d to 4f individually include level-1 cache memories 5d to 5f. It is noted that the description of the processor cores 4e and 4f is omitted because the processor cores 4e and 4f exert functions as similar to the functions of the processor core 4d.

The level-1 cache memories 5d to 5f include a plurality of cache lines having a line size of 64 bytes. The level-1 cache memories 5d to 5f are a cache memory of "2N1+6" bytes that includes "2N1" cache lines and stores "two" bits of state data, "34−N1" bits of tag data, and 64 bytes of data on the cache lines. Here, "N1" means the size of the index that is associated by the level-1 cache memories 5d to 5f with the cache lines of the level-1 cache memories 5d to 5f.

It is noted that the items of information stored on the cache lines of the level-1 cache memories 5d to 5f are to be similar to the items of information stored on the cache lines included in the cache memories 5a to 5c. Moreover, state data stored on the cache lines of the level-1 cache memories 5d to 5f is consistency information indicating the following consistency. Namely, state data indicates the consistency between data stored on the same cache line, data stored on the different level-1 cache memories 5d to 5f, and data stored on the level-2 cache memory 7.

As similar to the level-1 cache memories 5d to 5f, the level-2 cache memory 7 includes "2N2" cache lines on which 64 bits of data is individually stored. Moreover, the level-2 cache memory 7 is a cache memory of "2N2+6" bytes that stores "two" bits of state data, "34−N2" bits of tag data, and 64 bytes of data on the cache lines. Here, "N2" means the size of the index that is associated by the level-2 cache memory 7 with the cache lines of the level-2 cache memory 7. Furthermore, state data stored on the cache lines of the level-2 cache memory 7 indicates the consistency between data stored on the same cache line and data stored on the memory 6.

It is noted that the level-1 cache memories 5d to 5f and the level-2 cache memory 7 are direct mapping cache memories. For example, in the case where the level-1 cache memories 5d to 5f and the level-2 cache memory 7 hold data stored on a memory address "i" of the memory 6, the level-1 cache memories 5d to 5f and the level-2 cache memory 7 are to hold data on the cache line having a cache line number "i".

In the case where the communication device 10a receives data that the processor cores 4d to 4f do not wait for, the processor core 4d stores the received data on the memory 6. Moreover, in the case where the communication device 10a receives data that the processor core 4d waits for, the processor core 4d performs the following process. Namely, the processor core 4d determines whether data stored on the storage region indicated by the memory address of the memory 6 at which the received data is to be stored is cached on the level-1 cache memory 5d as a primary cache memory.

In the case where the processor core 4d determines that data stored on the storage region of the memory 6 indicated by the memory address is held on the level-1 cache memory 5d, the processor core 4d caches the received data on the level-1 cache memory 5d. Furthermore, in the case where the processor core 4d determines that data stored on the storage region of the memory 6 indicated by the memory address is not held on the level-1 cache memory 5d, the processor core 4d stores the received data on the memory 6.

Next, exemplary processes performed by the processor core 4d will be described. For example, in the case where the processor core 4d receives data from the communication device 10a as data to be stored on the memory 6, the processor core 4d performs the following process. Namely, the processor core 4d makes reference to state data stored on the cache line of the level-1 cache memory 5d corresponding to the index of the memory address at which the received data is to be stored. In the case where the referenced state data is "M", the processor core 4d writes data on the same cache line on which the referenced state data is stored to the memory 6, and updates the referenced state data from "M" to "I". The processor core 4d then stores the received data on the memory 6.

On the other hand, in the case where the processor core 4d receives data from the communication device 10a as data to be stored on the cache memories 5d to 5f, the processor core 4d performs the following process. Namely, the processor core 4d makes reference to the state data and the tag data on the cache line corresponding to the index of the memory address at which the received data is to be stored. In the case where "I" is stored in the referenced state data, or in the case where the referenced tag data is different from the tag of the memory address at which the received data is to be stored, the processor core 4d stores the received data on the memory 6.

Moreover, in the case where "S" is stored in the referenced state data and the referenced tag data is matched with the tag of the memory address at which the received data is to be stored, the processor core 4d stores the received data on the memory 6, and updates the referenced state data from "S" to "I". Furthermore, in the case where "M" or "E" is stored in the referenced state data and the referenced tag data is matched with the tag of the memory address at which the received data is to be stored, the processor core 4d performs the following process. Namely, the processor core 4d stores the received data on the cache memory of the processor core 4d, that is, the processor core 4d stores the received data on the level-1 cache memory 5d, and updates the referenced state data to "M". In the storing, the processor core 4d does not store the received data on the memory 6.

It is noted that in the case where the processor core 4d stores the received data on the memory 6, the processor core 4d performs a process of maintaining data coherency, which is the data consistency between the cache memories 5a to 5c and the main memory 6, prior to writing. Namely, the processor core 4d makes reference to the state data and the tag data on the cache line of the level-2 cache memory 7 corresponding to the index of the memory address at which the received data is to be stored. In the case where the referenced state data is "M" and the tag data is matched with the tag of the memory address at which the received data is to be stored, the processor core 4d stores, on the memory 6, data stored on the same cache line on which the referenced state data is stored. After the storing, the processor core 4d updates the referenced state data from "M" to "I", and stores the received data on the memory 6.

In other words, in the case where the communication device 10a receives information to be subjected to the polling process at any one of the processor cores 4d to 4f, the processor core 4d receives the received data as data to be stored on the level-1 cache memory 5d. In this case, the processor core 4d determines whether data stored on the storage region of the memory 6 on which the received data is to be stored is exclusively cached on the level-1 cache memory 5d. In the case where data stored on the storage region of the memory 6 on which the received data is to be stored is exclusively cached on the level-1 cache memory 5d, the processor core 4d caches the received data on the level-1 cache memory 5d.

Generally, the processor core 4d caches data at the memory address at which data to be subjected to the polling process is to be stored. Therefore, in the case where the communication device 10a receives data that the processor core 4d waits for, the information processing apparatus 2e stores the received data on the level-1 cache memory 5d, not on the memory 6. As a result, the parallel computer system 1b can cause the information processing apparatuses 2e and 2f to efficiently perform processes.

Effect of the Third Embodiment

As described above, the information processing apparatus 2e includes the processor 3b having a plurality of the processor cores 4d to 4f. Moreover, the processor cores 4d to 4f individually include the level-1 cache memories 5d to 5f. In the case where the information processing apparatus 2e receives a packet from a different information processing apparatus such as the information processing apparatus 2f, the information processing apparatus 2e determines whether "1" is stored on the flag region of the received packet as control information.

In the case where "1" is stored as control information, the information processing apparatus 2e stores the received data on the level-1 cache memories 5d to 5f that cache data stored at the memory address at which the received data is to be stored. Moreover, in the case where "0" is stored as control information, the information processing apparatus 2e stores data in the received packet on the memory 6.

Therefore, in the case where the information processing apparatus 2e receives data to be subjected to the polling process at the processor cores 4d to 4f, the information processing apparatus 2e can directly store the received data on the level-1 cache memories 5d to 5f. Thus, the information processing apparatus 2e can cause the processor 3b to efficiently perform arithmetic operations.

Furthermore, in the case where the information processing apparatus 2e receives data that is not subjected to the polling process at the processor cores 4d to 4f, the information processing apparatus 2e stores the received data on the memory 6. Therefore, the information processing apparatus 2e can prevent data for use in arithmetic operations at the processor cores 4d to 4f from being discharged out of the level-1 cache memories 5d to 5f caused by the received data. Thus, the parallel computer system 1b can efficiently perform arithmetic operations without reducing calculation processing speed.

In addition, the level-1 cache memories 5d to 5f store first consistency information, which is state data, indicating the relationship between data cached on the level-1 cache memories 5d to 5f, data stored on different level-1 cache memories 5d to 5f, and data stored on the level-2 cache memory 7. Moreover, the level-2 cache memory 7 stores second consistency information, which is state data, indicating the relationship between data cached on the level-2 cache memory 7 and data cached on the memory 6. The processor cores 4d to 4f maintain the consistency between data stored on the level-1 cache memories 5d to 5f, data stored on the level-2 cache memory 7, and data stored on the memory 6 based on the first consistency information and the second consistency information.

Accordingly, even in the case where the processor cores 4d to 4f include the level-1 cache memories 5d to 5f of the processor cores 4d to 4f and share the level-2 cache memory 7, the parallel computer system 1b can appropriately maintain data consistency and can perform appropriate arithmetic operations.

Fourth Embodiment

Figure 10:
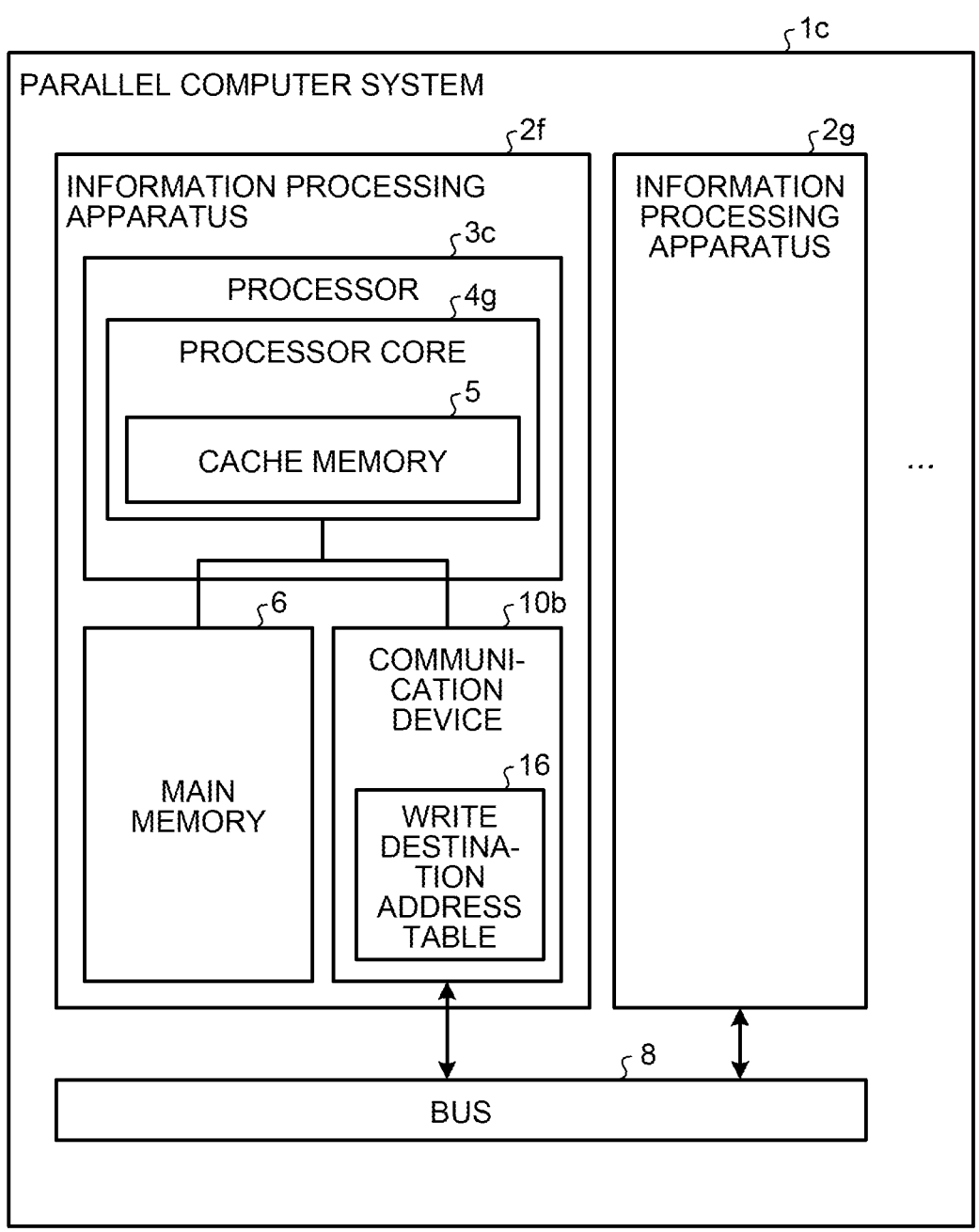
FIG. 10 is a diagram illustrating a parallel computer system according to a fourth embodiment.

In a fourth embodiment below, an exemplary parallel computer system will be described with reference to FIG. 10. FIG. 10 is a diagram illustrating a parallel computer system according to the fourth embodiment. As illustrated in FIG. 10, a parallel computer system 1c includes a plurality of information processing apparatuses 2f and 2g. It is noted that although omitted in FIG. 10, the parallel computer system 1c may include a large number of information processing apparatuses. Moreover, the description of the information processing apparatus 2g is omitted below because the information processing apparatus 2g performs processes as similar to the processes of the information processing apparatus 2f. Furthermore, units that perform processes similar to the processes of the units involved in the units according to the first to the fourth embodiments are designated the same reference numerals and signs, and the description is omitted below.

The information processing apparatus 2f includes a processor 3c, a memory 6, and a communication device 10b. The processor 3c includes a processor core 4g. The processor core 4g includes a cache memory 5. Moreover, the communication device 10b includes a write destination address table 16.

The processor core 4g performs processes as similar to the processes of the processor core 4 according to the first embodiment. In other words, in the case where the processor core 4g receives data from the communication device 10b as data to be stored on the memory 6, the processor core 4g performs processes as similar to the processes of the processor core 4, and stores the received data on the memory 6. Moreover, in the case where the processor core 4g receives data from the communication device 10b as data to be stored on the cache memory 5, the processor core 4g performs processes as similar to the processes of the processor core 4, and stores the received data on the cache memory 5. Therefore, the description of processes that the processor core 4g stores data on the cache memory 5 or the memory 6 is omitted.

Furthermore, in the case where the processor core 4g performs the polling process that received data is waited for, the processor core 4g registers the memory address of the memory 6 at which data to be subjected to the polling process is to be stored on the write destination address table 16 of the communication device 10b immediately before the polling process. More specifically, the processor core 4g sends the memory address of the memory 6 at which data to be subjected to the polling process is to be stored to the communication device 10b, and causes an updating unit 17, described later, of the communication device 10b to store the memory address sent to the write destination address table 16.

In addition, in the case where the processor core 4g receives data to be subjected to the polling process from a communication device 10c and stores the received data on the cache memory 5, the processor core 4g notifies a message indicating that data to be subjected to the polling process is stored on the cache memory 5 to the communication device 10c. For example, the processor core 4g sends, to the communication device 10b, a message indicating that data to be subjected to the polling process is stored on the cache memory 5 and the memory address of the memory 6 at which data stored on the cache memory 5 is to be stored.

The communication device 10b includes the write destination address table 16 that maintains control addresses to control writing data on the cache memory 5. In the case where the write destination address of the data received from a different information processing apparatus such as the information processing apparatus 2g is matched with the control address maintained on the write destination address table 16, the communication device 10b performs the following process. Namely, the communication device 10b sends the received data as data to be stored on the cache memory 5 to the processor core 4g.

Moreover, in the case where the write destination address of the received data is not matched with the control address maintained on the write destination address table 16, the communication device 10b sends the received data as data to be stored on the memory 6 to the processor core 4g.

Furthermore, in the case where the communication device 10b receives, from the processor core 4g, a notification indicating that data to be subjected to the polling process is stored on the cache memory 5, the communication device 10b performs the following process. Namely, the communication device 10b deletes the memory address of the memory 6 at which data stored on the cache memory 5 is to be stored from the write destination address table 16.

For example, the communication device 10b receives, from the processor core 4g, a message indicating that data to be subjected to the polling process is stored on the cache memory 5 and the memory address of the memory 6 at which data stored on the cache memory 5 is to be stored. In this case, the communication device 10b searches the write destination address table 16 for the received memory address, and deletes the searched memory address from the write destination address table 16.

Figure 11:
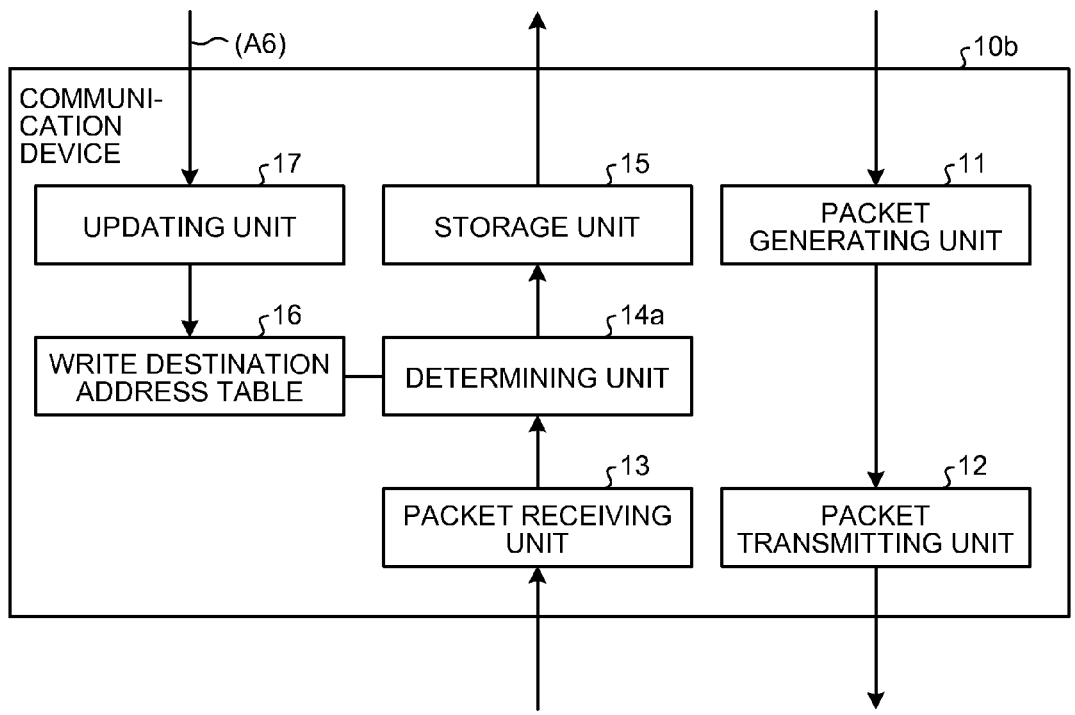
FIG. 11 is a diagram illustrating an exemplary communication device according to the fourth embodiment.

In the following, the communication device 10b will be described with reference to FIGS. 11 and 12. First, the units included in the communication device 10b will be described with reference to FIG. 11. FIG. 11 is a diagram illustrating an exemplary communication device according to the fourth embodiment. As illustrated in FIG. 11, the communication device 10b includes a packet generating unit 11, a packet transmitting unit 12, a packet receiving unit 13, a determining unit 14a, a storage unit 15, the write destination address table 16, and the updating unit 17.

The write destination address table 16 maintains memory addresses at which data to be subjected to the polling process at the processor core 4g is stored. Here, FIG. 12 is a diagram illustrating an exemplary write destination address table. In the example illustrated in FIG. 12, the write destination address table 16 includes N line memories having line numbers "0" to "N−1" at which a memory address is stored.

Figure 12:
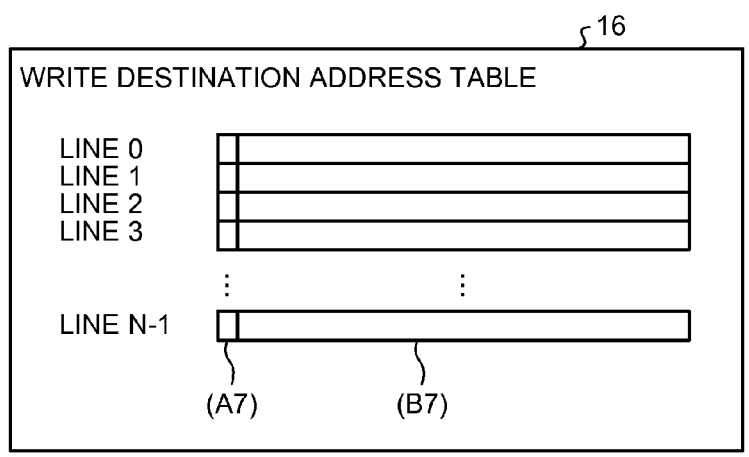
FIG. 12 is a diagram illustrating an exemplary write destination address table.

For example, in the line memories, a valid bit is stored in a one-bit region illustrated in (A7) in FIG. 12, and a memory address is stored in a 64-bit range illustrated in (B7) in FIG. 12. Here, the valid bit means a bit indicating whether the memory address stored on the corresponding line memory is valid data. For example, in the case where "0" is stored on the valid bit, this indicates that data at the memory address stored on the corresponding line memory is invalid. Moreover, for example, in the case where "1" is stored on the valid bit, this indicates that data at the memory address stored on the corresponding line memory is valid. It is noted that the write destination address table 16 is a semiconductor memory device such as RAM (Random Access Memory), ROM (Read Only Memory), and flash memory.

In the case where the determining unit 14a receives a packet from the packet receiving unit 13, the determining unit 14a acquires the memory address of the memory 6 at which data stored in the received packet is to be stored. Moreover, the determining unit 14a determines whether a memory address the same as the acquired memory address is stored on the write destination address table 16.

Namely, the determining unit 14a compares the acquired memory address with the memory address stored on the line memory corresponding to the valid bit "1" in the line memories included in the write destination address table 16. In the case where the memory address stored on the line memory on which "1" is stored on the valid bit is matched with the acquired memory address, the determining unit 14a determines that data stored in the received packet is data to be stored on the cache memory 5.

On the other hand, in the case where the determining unit 14a determines that the acquired memory address is not matched with the memory address stored on the line memory corresponding to the valid bit "1", the determining unit 14a determines that data stored in the received packet is data to be stored on the memory 6.

As illustrated in (A6) in FIG. 11, in the case where the updating unit 17 receives, from the processor core 4g, the memory address of the memory 6 at which data to be subjected to the polling process is to be stored, the updating unit 17 adds the received memory address on the write destination address table 16. Moreover, in the case where the updating unit 17 receives, from the processor core 4g, a notification indicating that data to be subjected to the polling process is acquired, the updating unit 17 deletes the memory address of the memory 6 at which data to be subjected to the polling process is to be stored from the write destination address table 16.

For example, in the case where the updating unit 17 receives, from the processor core 4g, the memory address of the memory 6 at which data to be subjected to the polling process is to be stored, the updating unit 17 selects a line memory on which the corresponding valid bit is "0" from the line memories included in the write destination address table 16. The updating unit 17 then stores the memory address received from the processor core 4g on the selected line memory, and updates the valid bit of the selected line memory to "1".

Furthermore, in the case where the updating unit 17 receives, from the processor core 4g, a message indicating that data to be subjected to the polling process is stored on the cache memory 5 and the memory address of the memory 6 at which data stored on the cache memory 5 is to be stored, the updating unit 17 performs the following process. Namely, the updating unit 17 searches the line memories included in the write destination address table 16 for a line memory on which the corresponding valid bit is "1" and on which the address received from the processor core 4g is stored. The updating unit 17 then updates the valid bit corresponding to the searched line memory to "0". It is noted that the updating unit 17 is an electronic circuit. Here, for examples of the electronic circuit, an integrated circuit such as an ASIC (Application Specific Integrated Circuit) and a FPGA (Field Programmable Gate Array), or a CPU (Central Processing Unit), a MPU (Micro Processing Unit), and the like are applied.

Process Flow of the Communication Device 10b

Figure 13:
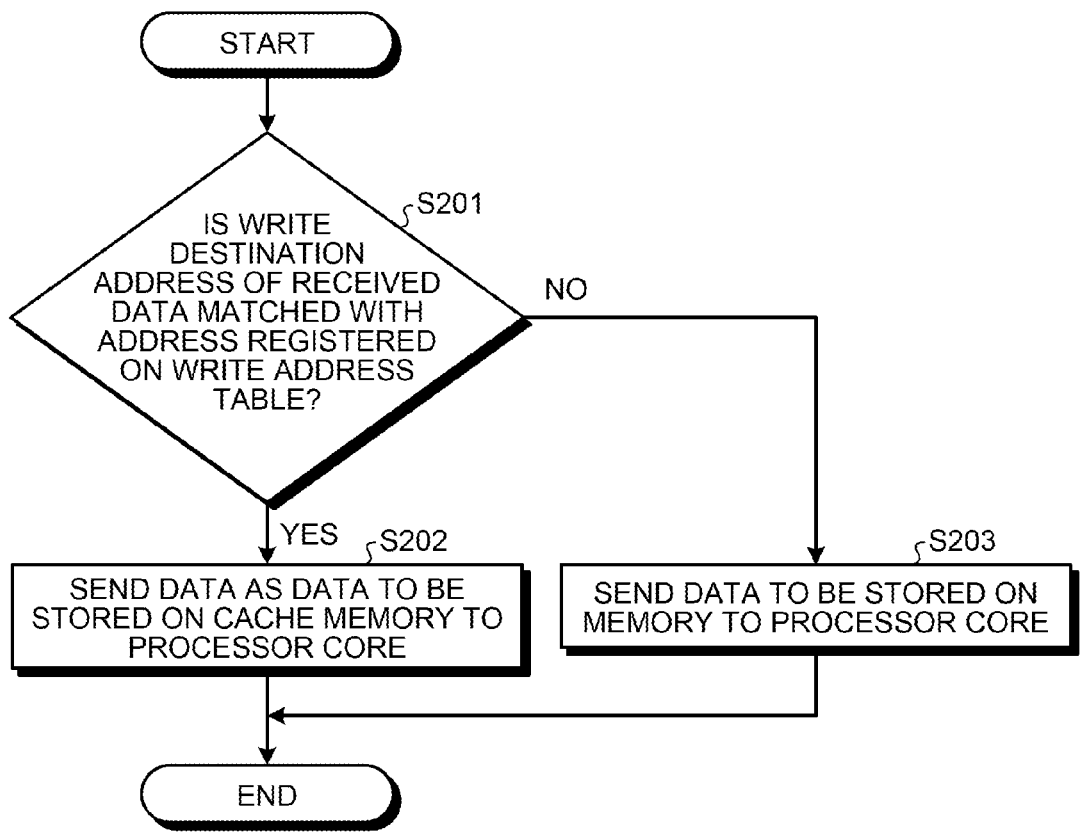
FIG. 13 is a flowchart illustrating a process flow performed by the communication device according to the fourth embodiment.

Next, a process flow performed by the communication device 10b will be described with reference to FIG. 13. FIG. 13 is a flowchart illustrating a process flow performed by the communication device according to the fourth embodiment. In the example illustrated in FIG. 13, the communication device 10b starts processes at a trigger that the communication device 10b receives a packet whose destination is the information processing apparatus 2f through the bus 8.

First, the communication device 10b determines whether the write destination address of data stored in the received packet is matched with the memory address stored on the write destination address table 16 (Step S201). In other words, the communication device 10b determines whether the memory address of the memory 6 at which the received data is to be stored is registered on the write destination address table 16.

In the case where the write destination address of data stored in the received packet is matched with the memory address stored on the write destination address table 16 (yes in Step S201), the communication device 10b performs the following process. Namely, the communication device 10b sends data in the received packet as data to be stored on the cache memory 5 to the processor core 4g (Step S202).

On the other hand, in the case where the write destination address of data stored in the received packet is not matched with the memory address stored on the write destination address table 16 (no in Step S201), the communication device 10b performs the following process. Namely, the communication device 10b sends data in the received packet as data to be stored on the memory 6 to the processor core 4g (Step S203). After the sending, the communication device 10b ends the processes.

Effect of the Fourth Embodiment

As described above, the information processing apparatus 2f includes the write destination address table 16 that maintains memory addresses at which data to be subjected to the polling process at the processor core 4g is stored. Moreover, in the case where the processor core 4g performs the polling process, the information processing apparatus 2f stores the memory address at which data to be subjected to the polling process is to be stored on the write destination address table 16.

In the case where the information processing apparatus 2f receives data from a different information processing apparatus such as the information processing apparatus 2g, the information processing apparatus 2f determines whether the memory address at which the received data is to be stored is stored on the write destination address table 16. Furthermore, in the case where the information processing apparatus 2f determines that the memory address at which the received data is to be stored is stored on the write destination address table 16, the information processing apparatus 2f stores the received data on the cache memory 5. In addition, in the case where the information processing apparatus 2f determines that the memory address at which the received data is to be stored is not stored on the write destination address table 16, the information processing apparatus 2f stores the received data on the memory 6.

Therefore, when the information processing apparatus 2f receives data that is not used for arithmetic operations at the processor core 4g, the information processing apparatus 2f prevents data stored on the cache memory 5 from being discharged. Accordingly, the processor cores of the information processing apparatuses 2f and 2g can perform efficient processing using data stored on the cache memories, so that the parallel computer system 1c can prevent a reduction in calculation processing speed.

Fifth Embodiment

Figure 14:
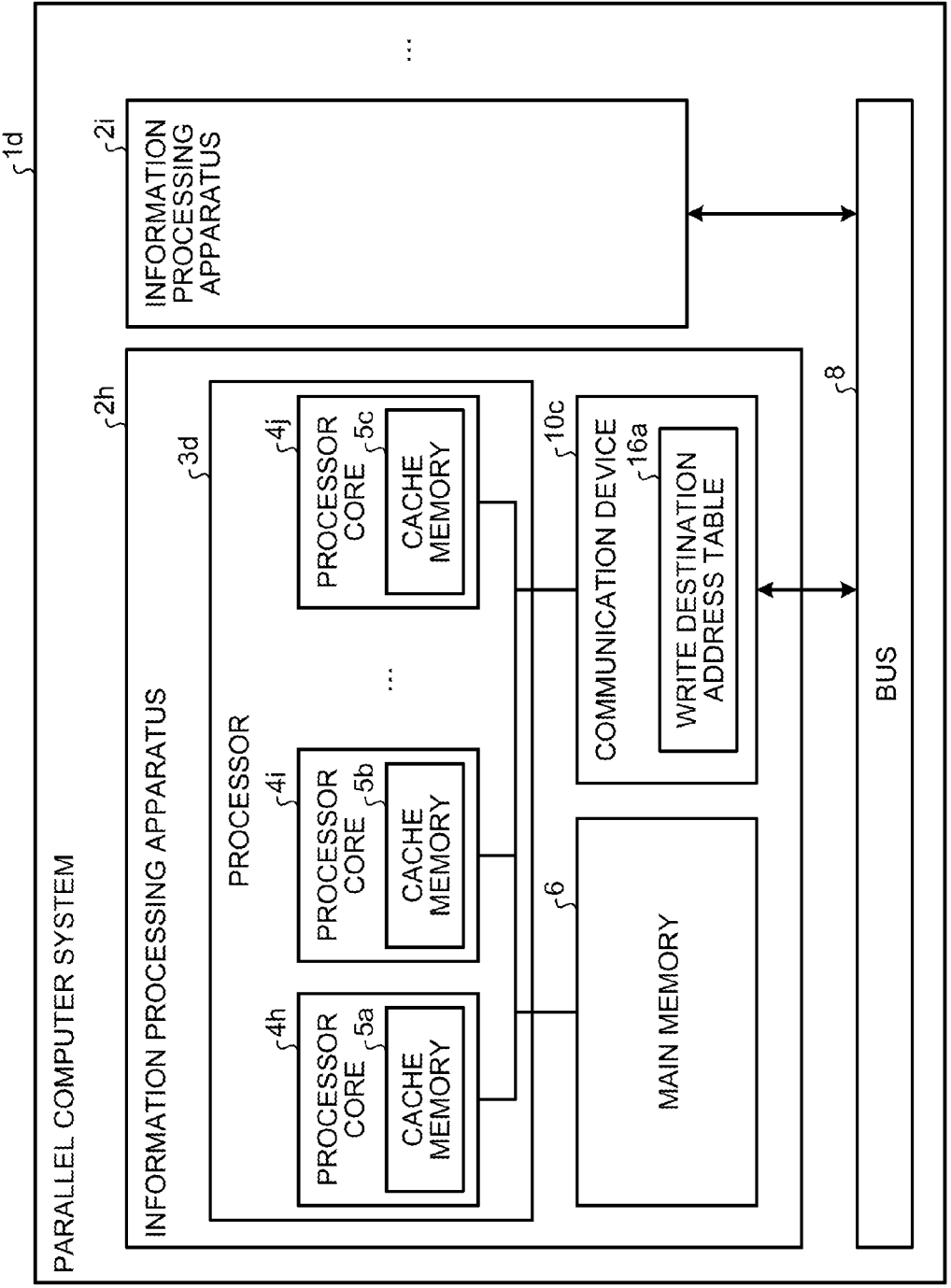
FIG. 14 is a diagram illustrating an exemplary parallel computer system according to a fifth embodiment.

In a fifth embodiment, a parallel computer system 1d including a plurality of information processing apparatuses each provided with a processor including a plurality of processor cores will be described. FIG. 14 is a diagram illustrating an exemplary parallel computer system according to the fifth embodiment. In the example illustrated in FIG. 14, a parallel computer system 1d is provided with a plurality of information processing apparatuses including information processing apparatuses 2h and 2i. It is noted that the description of the information processing apparatuses such as the information processing apparatus 2i is omitted because the information processing apparatus 2i performs processes as similar to the processes of the information processing apparatus 2h. Moreover, in the units included in the information processing apparatus 2h, units that perform processes as similar to the processes of the units included in the information processing apparatus 2b are designated the same reference numerals and signs, and the description is omitted.

The information processing apparatus 2h includes a processor 3d having a plurality of processor cores 4h to 4j, a memory 6, and a communication device 10c. The processor cores 4h to 4j include cache memories 5a to 5c. Moreover, the communication device 10c includes a write destination address table 16a.

As similar to the processor core 4a according to the second embodiment, in the case where the processor core 4h receives data to be stored on the memory 6 from the communication device 10c, the processor core 4h stores the received data on the memory 6. Furthermore, in the case where the processor core 4h receives data to be stored on the cache memory 5a from the communication device 10c, the processor core 4h stores the received data on the cache memory 5a.

In addition, in the case where the processor core 4h stores the received data on the cache memory 5a or the memory 6, the processor core 4h performs the following process. In other words, as similar to the processor core 4a, the processor core 4h maintains the coherency between data stored on the cache memory 5a and data stored on the memory 6 based on consistency information stored on the cache memory 5a.

More specifically, the processor core 4h maintains data coherency, which is the consistency between data stored on the cache memory 5a and data stored on the memory 6 according to state data stored on the cache lines included on the cache memory 5a. After the holding, the processor core 4h stores the received data on the cache memory 5a or the memory 6. It is noted that the description of the detailed process of maintaining the coherency between data stored on the cache memory 5a and data stored on the memory 6 by the processor core 4h is omitted because the processor core 4h performs processes as similar to the processes performed by the processor core 4a.

Moreover, as similar to the processor core 4g according to the fourth embodiment, in the case where the processor core 4h performs the polling process, the processor core 4h registers the write destination address of data to be subjected to the polling process on the write destination address table 16 of the communication device 10c immediately before the polling process. In the registration, the processor core 4h registers the write destination cache memory identification information indicating the cache memory 5a of the processor core 4h in association with the memory address together with the write destination address.

The communication device 10c includes the write destination address table 16a that maintains write destination cache memory identification information to identify the cache memories 5a to 5c in association with the memory address at which the received data is to be stored. As similar to the communication device 10b according to the fourth embodiment, in the case where the communication device 10c receives a packet from a different information processing apparatus such as the information processing apparatus 2i, the communication device 10c performs the following process. Namely, the communication device 10c determines whether a memory address the same as a memory address at which the received packet is to be stored is stored on the write destination address table 16a.

In the case where a memory address the same as a memory address at which the received packet is to be stored is stored on the write destination address table 16a, the communication device 10c performs the following process. Namely, the communication device 10c determines a processor core including a cache memory indicated by write destination cache memory identification information associated with a memory address the same as a memory address at which the received packet is to be stored. The communication device 10c sends the received data as data to be stored on the cache memory to the determined processor core.

On the other hand, in the case where a memory address the same as a memory address at which the received packet is to be stored is not stored on the write destination address table 16a, the communication device 10c sends the received data as data to be stored on the memory 6 to the processor cores 4h to 4j.

Figure 15:
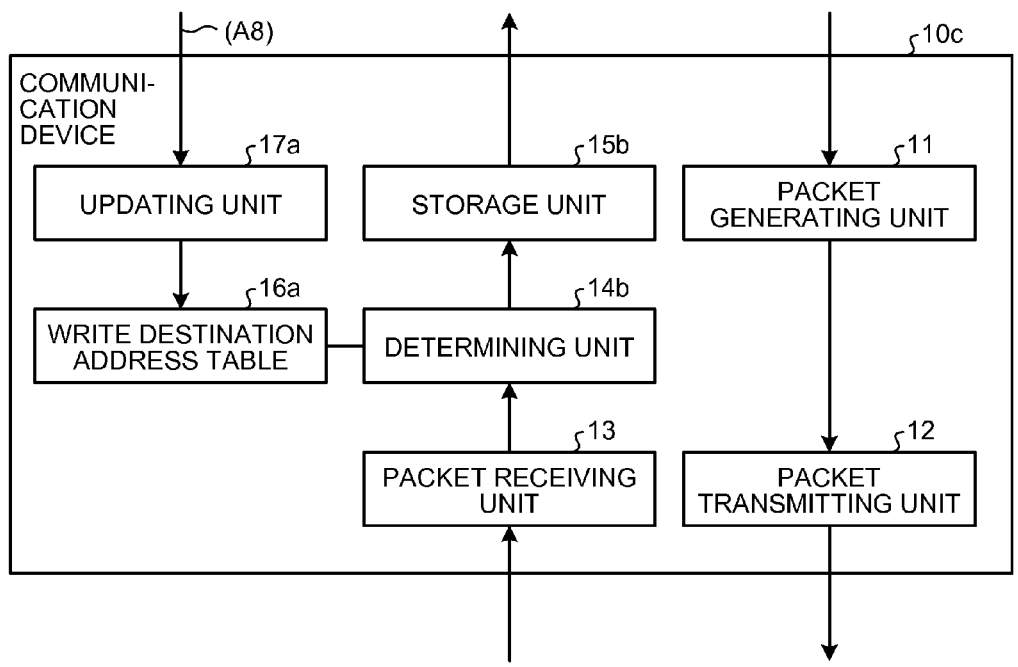
FIG. 15 is a diagram illustrating an exemplary communication device according to the fifth embodiment.

Next, the units included in the communication device 10c will be described with reference to FIG. 15. FIG. 15 is a diagram illustrating an exemplary communication device according to the fifth embodiment. It is noted that in the units included in the communication device 10c, the units that perform processes as similar to the processes of the units illustrated in the first to the fourth embodiments are designated the same reference numerals and signs, and the description is omitted.

In the example illustrated in FIG. 15, the communication device 10c includes a storage unit 15b, a determining unit 14b, the write destination address table 16a, and an updating unit 17a. As similar to the write destination address table 16 according to the fourth embodiment, the write destination address table 16a maintains memory addresses at which data to be subjected to the polling process is to be stored. Moreover, the write destination address table 16a maintains write destination cache memory identification information to identify a cache memory included in a processor core that performs the polling process in association with the memory addresses.

For example, the write destination address table 16a includes a plurality of line memories that a storage region in which write destination cache memory identification information is stored is further added to the line memories of the write destination address table 16. The write destination address table 16a stores the memory address to be associated and write destination cache memory identification information on the same line memory.

The determining unit 14b acquires the memory address of the memory 6 at which data stored in the packet received at the packet receiving unit 13 is to be stored. The determining unit 14b then determines whether a memory address the same as the acquired memory address is stored on the write destination address table 16a.

In the case where a memory address the same as the acquired memory address is stored on the write destination address table 16a, the determining unit 14b then performs the following process. Namely, the determining unit 14b acquires write destination cache memory identification information stored in association with the memory address stored on the write destination address table 16a. The determining unit 14b then determines that data stored in the received packet is data to be stored on the cache memory indicated by the acquired write destination cache memory identification information.

On the other hand, in the case where a memory address the same as the acquired memory address is not stored on the write destination address table 16a, the determining unit 14b determines that data stored in the received packet is data to be stored on the memory 6.

In the case where the determining unit 14b determines that the received data is data to be stored on the cache memory, the storage unit 15b performs the following process. Namely, the storage unit 15b sends the received data as data to be stored on the cache memory to a processor core including the cache memory indicated by the write destination cache memory identification information acquired at the determining unit 14b. For example, in the case where the determining unit 14b determines that the received data is data to be stored on the cache memory 5a, the storage unit 15b sends the received data to the processor core 4h.

On the other hand, in the case where the determining unit 14b determines that data stored in the received packet is data to be stored on the memory 6, the storage unit 15b sends the received data as data to be stored on the memory 6 to the processor cores 4h to 4j.

As illustrated in (A8) in FIG. 15, the updating unit 17a receives, from the processor cores 4h to 4j, the memory address at which data to be subjected to the polling process is to be stored. At the same time, the updating unit 17a receives write destination cache memory identification information indicating the cache memories 5a to 5c included in the processor cores 4h to 4j. In this case, the updating unit 17a stores the received data and the received write destination cache memory identification information on a single memory line included in the write destination address table 16a.

Moreover, as similar to the updating unit 17, in the case where the updating unit 17a receives, from the processor cores 4h to 4j, a memory address and a message indicating that data to be subjected to the polling process is stored on the cache memory, the updating unit 17a performs the following process. Namely, the updating unit 17a searches the write destination address table 16a for a line memory on which the received memory address is stored, and updates the valid bit corresponding to the searched line memory to "0".

For example, in the case where the processor core 4h performs the polling process, the information processing apparatus 2h including such units performs the following process.

Namely, the information processing apparatus 2h stores the memory address at which data to be subjected to the polling process is to be stored and the write destination cache memory identification information indicating the cache memory 5a on the write destination address table 16a in association with each other. In the case where the information processing apparatus 2h receives a packet from an information processing apparatus such as the information processing apparatus 2i, the information processing apparatus 2h determines whether the memory address at which data stored in the received packet is to be stored is stored on the write destination address table 16a.

In the determination, in the case where data stored in the received packet is data to be subjected to the polling process at the processor core 4h, the memory address for storage is stored on the write destination address table 16a. Therefore, the information processing apparatus 2h determines that the processor core performing the polling process is the processor core 4h, from write destination cache memory identification information indicating the cache memory 5a stored in association with the memory address at which the received data is to be stored. The information processing apparatus 2h then sends the received data to the processor core 4h, and stores the received data on the cache memory 5a.

Effect of the Fifth Embodiment

As described above, the information processing apparatus 2h stores the memory address at which data to be subjected to the polling process is to be stored and write destination cache memory identification information indicating the cache memory on the write destination address table 16a in association with each other. The information processing apparatus 2 determines whether the memory address at which data in the received packet is to be stored is stored on the write destination address table 16a. In the case where the memory address is stored, the information processing apparatus 2 performs the following process. Namely, the information processing apparatus 2h stores the received data on a cache memory indicated by destination cache memory identification information stored in association.

Therefore, in the case where the information processing apparatus 2h receives data to be subjected to the polling process at the processor cores 4h to 4j, the information processing apparatus 2h can directly store the received data on the cache memories 5a to 5c. Thus, also in the case where the processor including the information processing apparatuses 2h and 2i is a multi-core processor including a plurality of processor cores, the parallel computer system 1d can efficiently perform arithmetic operations.

Moreover, as similar to the information processing apparatuses 2 to 2g according to the other embodiments, when the information processing apparatus 2h receives data that is not used for arithmetic operations at the processor cores 4h to 4j, the information processing apparatus 2h can prevent data stored on the cache memories 5a to 5c from being discharged. As a result, the parallel computer system 1d can prevent a reduction in calculation processing speed.

Furthermore, as similar to the information processing apparatus 2f, the information processing apparatus 2h maintains the consistency between data stored on the cache memory 5a and data stored on the memory 6 based on consistency information stored on the cache memory 5a. Accordingly, the parallel computer system 1d can cause the information processing apparatuses 2h and 2i to perform appropriate processing.

Sixth Embodiment

In a sixth embodiment, a parallel computer system including a processor provided with a plurality of information processing apparatuses including a plurality of processor cores each having their own L1 cache memory and a single L2 cache memory shared between the processor cores will be described. FIG. 16 is a diagram illustrating a parallel computer system according to the sixth embodiment.

As illustrated in FIG. 16, a parallel computer system 1*e* includes a plurality of information processing apparatuses such as information processing apparatuses 2*j* and 2*k*. It is noted that the description of the information processing apparatus 2*k* is omitted because the information processing apparatus 2*k* or the like performs processes as similar to the processes of the information processing apparatus 2*j*.

Moreover, in the units included in the parallel computer system 1*e*, units that perform processes as similar to the processes of the units of the parallel computer system 1*b* are designated the same reference numerals and signs, and the description is omitted below.

The information processing apparatus 2*j* includes a processor 3*e* having a plurality of processor cores 4*k* to 4*m* and a level-2 cache memory 7 shared between the processor cores 4*k* to 4*m*. Moreover, the processor cores 4*k* to 4*m* individually include level-1 cache memories 5*d* to 5*f*. It is noted that the description of the processor cores 4*l* and 4*m* is omitted below because the processor cores 4*l* and 4*m* perform processes as similar to the processes of the processor core 4*k*.

As similar to the processor core 4*h* according to the fifth embodiment, in the case where a communication device 10*d* receives data as data to be stored on the level-1 cache memory 5*d*, the processor core 4*k* stores the received data on the level-1 cache memory 5*d*. Moreover, in the case where the communication device 10*d* receives data as data to be stored on a memory 6, the processor core 4*k* stores the received data on the memory 6.

Furthermore, in the case where the processor core 4*k* stores data on the level-1 cache memory 5*d* or the level-2 cache memory 7, the processor core 4*k* performs processes as similar to the processes of the processor core 4*d* according to the sixth embodiment. Namely, the processor core 4*k* maintains the consistency between data stored on the level-1 cache memory 5*d*, data stored on the level-2 cache memory 7, and data stored on the memory 6 based on first consistency information and second consistency information.

In addition, in the case where the processor core 4*k* performs the polling process, the processor core 4*k* sends, to the communication device 10*d*, the memory address at which data to be subjected to the polling process is to be stored and write destination cache memory identification information indicating the level-1 cache memory 5*d*. In other words, the processor core 4*k* stores the memory address at which data to be subjected to the polling process is to be stored and write destination cache memory identification information indicating the level-1 cache memory 5*d* on a write destination address table 16*b* in association with each other.

Moreover, in the case where the processor core 4*k* stores data to be subjected to the polling process on the level-1 cache memory 5*d*, the processor core 4*k* sends, to the communication device 10*d*, a message indicating that data is stored on the level-1 cache memory 5*d* and a memory address at which data is to be stored. In other words, the processor core 4*k* deletes the memory address at which data to be subjected to the polling process is to be stored or the like from the write destination address table 16*b*.

The communication device 10*d* includes the write destination address table 16*b*. As similar to the write destination address table 16*a*, the write destination address table 16*b* stores the items of information below in association with each other. Namely, the write destination address table 16*b* stores the memory address at which data to be subjected to the polling process is to be stored and write destination cache memory identification information to identify the level-1 cache memories 5*d* to 5*f* in association with each other.

As similar to the communication device 10*c*, in the case where the communication device 10*d* receives a packet from a different information processing apparatus such as the information processing apparatus 2*k*, the communication device 10*d* performs the following process. Namely, the communication device 10*d* determines whether a memory address the same as a memory address at which the received packet is to be stored is stored on the write destination address table 16*b*.

In the case where a memory address the same as a memory address at which the received packet is to be stored is stored on the write destination address table 16*b*, the communication device 10*d* performs the following process. Namely, the communication device 10*d* determines a processor core including the level-1 cache memory indicated by the write destination cache memory identification information in association with a memory address the same as a memory address at which the received packet is to be stored. The communication device 10*d* sends the received data as data to be stored on the cache memory to the determined processor core.

On the other hand, in the case where a memory address the same as a memory address at which the received packet is to be stored is not stored on the write destination address table 16*b*, the communication device 10*d* sends the received data as data to be stored on the memory 6 to the processor cores 4*k* to 4*f*.

For example, in the case where the processor core 4*k* performs the polling process, the information processing apparatus 2*j* including such units performs the following process. Namely, the information processing apparatus 2*j* stores the memory address at which data to be subjected to the polling process is to be stored and write destination cache memory identification information indicating the level-1 cache memory 5*d* on the write destination address table 16*b* in association with each other. In the case where the information processing apparatus 2*j* receives a packet from a different information processing apparatus such as the information processing apparatus 2*k*, the information processing apparatus 2*j* determines whether the memory address at which data stored in the received packet is to be stored is stored on the write destination address table 16*b*.

In the determination, in the case where data stored in the received packet is data to be subjected to the polling process at the processor core 4*k*, the memory address to be stored is stored on the write destination address table 16*b*. Therefore, the information processing apparatus 2*j* determines that the processor core performing the polling process is the processor core 4*k*, from write destination cache memory identification information indicating the level-1 cache memory 5*d* stored in association with the memory address at which the received data is to be stored. The information processing apparatus 2*j* then sends the received data to the processor core 4*k*, and stores the received data on the level-1 cache memory 5*d*.

Moreover, the information processing apparatus 2*j* performs the following process using first consistency information stored on the level-1 cache memories 5*d* to 5*f* and second consistency information stored on the level-2 cache memory 7. In other words, the information processing apparatus 2*j* maintains the consistency between data stored on the level-1 cache memories 5*d* to 5*f*, data stored on the level-2 cache memory 7, and data stored on the memory 6, and then stores the received data on the level-1 cache memories 5d to 5f or the memory 6.

Effect of the Sixth Embodiment

As described above, the information processing apparatus 2j stores the memory address at which data to be subjected to the polling process is to be stored and write destination cache memory identification information indicating the level-1 cache memory included in the processor core to perform the polling process in association with each other. In the case where the memory address at which the received data is to be stored is matched with the stored memory address, the information processing apparatus 2j then stores the received data on the level-1 cache memory indicated by the write destination cache memory identification information stored in association with the memory address. Therefore, the parallel computer system 1e can cause the processor cores 4k to 4m to efficiently perform arithmetic operations.

Moreover, in the case where the information processing apparatus 2j receives data that is not subjected to the polling process, the information processing apparatus 2j stores the received data on the memory 6. Therefore, the parallel computer system 1e can efficiently perform arithmetic operations without reducing calculation processing speed.

Furthermore, the information processing apparatus 2j performs the following process using first consistency information stored on the level-1 cache memories 5d to 5f and second consistency information stored on the level-2 cache memory 7. Namely, the information processing apparatus 2j appropriately maintains the consistency between data stored on the level-1 cache memories 5d to 5f, data stored on the level-2 cache memory 7, and data stored on the memory 6. Accordingly, the parallel computer system 1e can appropriately perform an arithmetic processing.

Seventh Embodiment

The embodiments of the present invention are described so far. The embodiments may be implemented in various different forms other than the foregoing embodiments. Therefore, in the following, the other embodiments included in the present invention will be described as a seventh embodiment.

(1) The Information Processing Apparatus Included in the Parallel Computer System The parallel computer systems 1 and 1c in the foregoing description include the processor cores 4 and 4g having the cache memory 5. However, the embodiments are not limited thereto. For example, the parallel computer systems 1 and 1c may include the processor provided with the processor core having the level-1 cache memory and the level-2 cache memory. The processor cores included in the parallel computer systems 1 and 1c may maintain data coherency using first consistency information stored on the level-1 cache memory and second consistency information stored on the level-2 cache memory.

Namely, the information processing apparatus determines whether the received data is data to be subjected to the polling process. In the case where the information processing apparatus determines that the received data is data to be subjected to the polling process, the information processing apparatus stores the received data on the cache memory. Moreover, in the case where the information processing apparatus determines that the received data is not data to be subjected to the polling process, the information processing apparatus stores the received data on the main memory. In other words, the information processing apparatus can have given configurations as long as the information processing apparatus is an information processing apparatus that executes such processes.

(2) The Parallel Computer System

The foregoing parallel computer systems 1 to 1e include a plurality of information processing apparatuses that exerts similar functions. However, the embodiments are not limited thereto. The parallel computer system may be provided with given information processing apparatuses according to the embodiments. In other words, the information processing apparatus determines whether data in the received packet is data to be subjected to the polling process and determines whether the memory address is stored on the write destination address table based on whether "1" is stored in the received packet as control information. The information processing apparatus may determine that data in the received packet is data to be subjected to the polling process in the case where any one of the conditions is satisfied.

According to an aspect, the technique disclosed in the present application suppresses a reduction in calculation processing speed.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus included in a parallel computer system including a plurality of information processing apparatuses, the information processing apparatus comprising:

a main storage device that holds data;

an arithmetic processing unit including a cache memory unit that holds a part of data held on the main storage device and a plurality of arithmetic operation units that performs arithmetic operations using data held on the main storage device or the cache memory unit; and a communication device that includes:

a transmitting unit that sends, to a different information processing apparatus, data that the arithmetic processing unit of the different information Processing apparatus waits for, and control information indicating that the data is to be written on the cache memory unit included in the arithmetic processing unit of the different information processing apparatus;

a determining unit that determines whether the control information is added to data received from the different information processing apparatus; and a storage unit that stores the received data on the cache memory unit when the determining unit determines that the control information is added to the received data and the cache memory unit holds data stored on a storage region of the main storage device indicated by a write destination address of the received data, stores the received data on the main storage device when the determining unit determines that the control information is added to the received data and the cache memory unit does not hold the data stored on a storage region of the main storage device indicated by a write destination address of the received data, and stores the received data on the main storage device when the determining unit determines that the control information is not added to the received data.

2. The information processing apparatus according to claim 1, wherein:
the cache memory unit stores consistency information indicating relationship between data held on the cache memory unit, data held on a different cache memory unit, and data held on the main storage device in association with the data; and
when the data is stored on the main storage device or the cache memory unit of the arithmetic operation unit, the arithmetic operation unit maintains consistency between data stored on the cache memory unit of the arithmetic operation unit and data stored on the main storage device based on the consistency information stored on the cache memory unit of the arithmetic operation unit, and stores received data on the main storage device or on the cache memory unit of the arithmetic operation unit.

3. The information processing apparatus according to claim 1, wherein:
the arithmetic processing unit further includes a shared cache memory unit shared between the plurality of arithmetic operation units;
the cache memory unit stores first consistency information indicating relationship between data held on the cache memory unit, data held on a different cache memory unit, and data held on the shared cache memory unit in association with the data;
the shared cache memory unit stores second consistency information indicating relationship between data held on the shared cache memory unit and data held on the main storage device in association with the data; and
when the data is stored on the main storage device or on the cache memory unit of the arithmetic operation unit, the arithmetic operation unit maintains consistency between data stored on the cache memory unit of the arithmetic operation unit, data stored on the shared cache memory unit, and data stored on the main storage device based on the first consistency information stored on the cache memory unit of the arithmetic operation unit and the second consistency information stored on the shared cache memory unit, and the arithmetic operation unit stores received data on the main storage device or on the cache memory unit of the arithmetic operation unit.

4. The information processing apparatus according to claim 1, wherein:
the communication device further includes an address holding unit that maintains a control address to control writing on the cache memory unit; and
when a write destination address of data received from a different information processing apparatus is matched with a control address maintained on the address holding unit, the communication device writes the received data on the cache memory unit.

5. The information processing apparatus according to claim 4, wherein the arithmetic operation unit causes the address holding unit to maintain a write destination address of data that the arithmetic operation unit waits for as the control address.

6. The information processing apparatus according to claim 4, wherein:
the arithmetic processing unit includes a plurality of arithmetic operation units including a cache memory unit; and
the plurality of arithmetic operation units causes the address holding unit to maintain a write destination address of data that is waited for as the control address, and the plurality of arithmetic operation units causes the address holding unit to maintain write destination cache memory identification information to identify a cache memory unit that is a write destination of the data waited for in the cache memory units of the plurality of arithmetic operation units.

7. The information processing apparatus according to claim 6, wherein:
the cache memory unit stores consistency information indicating relationship between data held on the cache memory unit, data held on a different cache memory unit, and data held on the main storage device in association with the data; and
when the data is stored on the main storage device or on the cache memory unit of the arithmetic operation unit, the arithmetic operation unit maintains consistency between data stored on the cache memory unit of the arithmetic operation unit and data stored on the main storage device based on the consistency information stored on the cache memory unit of the arithmetic operation unit, and the arithmetic operation unit stores received data on the main storage device or on the cache memory unit of the arithmetic operation unit.

8. The information processing apparatus according to claim 6, wherein:
the arithmetic processing unit further includes a shared cache memory unit shared between the plurality of arithmetic operation units;
the cache memory unit stores first consistency information indicating relationship between data held on the cache memory unit, data held on a different cache memory unit, and data held on the shared cache memory unit in association with the data;
the shared cache memory unit stores second consistency information indicating relationship between data held on the shared cache memory unit and data held on the main storage device in association with the data; and
when the data is stored on the main storage device or on the cache memory unit of the arithmetic operation unit, the arithmetic operation unit maintains consistency between data stored on the cache memory unit of the arithmetic operation unit, data stored on the shared cache memory unit, and data stored on the main storage device based on the first consistency information stored on the cache memory unit of the arithmetic operation unit and the second consistency information stored on the shared cache memory unit, and the arithmetic operation unit stores received data on the main storage device or on the cache memory unit of the arithmetic operation unit.

9. A parallel computer system comprising a plurality of information processing apparatuses, wherein the information processing apparatus includes:
a main storage device that holds data;
an arithmetic processing unit including a cache memory unit that holds a part of data held on the main storage device and a plurality of arithmetic operation units that performs arithmetic operations using data held on the main storage device or the cache memory unit; and
a communication device that includes:
a transmitting unit that sends, to a different information processing apparatus, data that the arithmetic processing unit of the different information processing apparatus waits for, and control information indicating that the data is to be written on the cache memory unit included in the arithmetic processing unit of the different information processing apparatus;

a determining unit that determines whether the control information is added to data received from the different information processing apparatus; and a storage unit that stores the received data on the cache memory unit when the determining unit determines that the control information is added to the received data and the cache memory unit holds data stored on a storage region of the main storage device indicated by a write destination address of the received data, stores the received data on the main storage device when the determining unit determines that the control information is added to the received data and the cache memory unit does not hold the data stored on a storage region of the main storage device indicated by a write destination address of the received data, and stores the received data on the main storage device when the determining unit determines that the control information is not added to the received data.

10. A control method for an arithmetic processing unit included in a parallel computer system, the parallel computer system including an information processing apparatus, a main storage device that holds data, and the arithmetic processing unit including a cache memory unit that holds a part of data held on the main storage device and a plurality of arithmetic operation units that performs arithmetic operations using data held on the main storage device or the cache memory unit, the method comprising:

sending, to a different information processing apparatus, data that the arithmetic processing unit of the different information processing apparatus waits for, and control information indicating that the data is to be written on the cache memory unit included in the arithmetic processing unit of the different information processing apparatus, by a communication device included in the information processing apparatus;

determining whether the control information is added to data received from the different information processing apparatus, by the communication device;

storing the received data on the cache memory unit when the communication device determines that the control information is added to the received data and the cache memory unit holds data stored on a storage region of the main storage device indicated by a write destination address of the received data;

storing the received data on the main storage device when the communication device determines that the control information is added to the received data and the cache memory unit does not hold the data stored on a storage region of the main storage device indicated by a write destination address of the received data; and storing the received data on the main storage device when the communication device determines that the control information is not added to the received data.

* * * * *